US012507896B1

(12) United States Patent
Reynard

(10) Patent No.: US 12,507,896 B1
(45) Date of Patent: Dec. 30, 2025

(54) AI-ASSISTED RAMAN SPECTROSCOPY FOR DIAGNOSIS AND ANALYSIS OF INTRAOCULAR TUMORS

(71) Applicant: Michael Reynard, Santa Monica, CA (US)

(72) Inventor: Michael Reynard, Santa Monica, CA (US)

( * ) Notice: Subject to any disclaimer, the term of this patent is extended or adjusted under 35 U.S.C. 154(b) by 0 days.

(21) Appl. No.: 19/204,089

(22) Filed: May 9, 2025

(51) Int. Cl.
*A61B 5/00* (2006.01)
*A61B 3/10* (2006.01)
*G16H 50/20* (2018.01)

(52) U.S. Cl.
CPC ............ *A61B 5/0075* (2013.01); *A61B 3/102* (2013.01); *A61B 5/7267* (2013.01); *G16H 50/20* (2018.01); *A61B 2576/02* (2013.01)

(58) Field of Classification Search
CPC ..... A61B 5/0075; A61B 3/102; A61B 5/7267; A61B 2576/02; G16H 50/20
USPC ....................................................... 351/200
See application file for complete search history.

(56) References Cited

U.S. PATENT DOCUMENTS

| | | |
|---|---|---|
| 7,508,524 B2 | 3/2009 | Mahadevan-Jansen et al. |
| 8,697,350 B2 | 4/2014 | Ruegg et al. |
| 9,681,798 B2 | 6/2017 | Hunter et al. |
| 10,376,600 B2 | 8/2019 | Peyman |
| 11,779,219 B2 | 10/2023 | Boppart et al. |
| 12,232,846 B2 | 2/2025 | Hillman et al. |

(Continued)

FOREIGN PATENT DOCUMENTS

| | | |
|---|---|---|
| EP | 1383417 B1 | 12/2009 |
| WO | 2019142136 A1 | 7/2019 |
| WO | 2020160462 A1 | 8/2020 |

OTHER PUBLICATIONS

Char DH, Crawford JB, Howes E, Carolan JA. Amyloid Mass of the Ciliary Body. Arch Ophthalmol. 2006;124(6):908-910. doi:10.1001/archopht.124.6.908.

(Continued)

*Primary Examiner* — Mohammed A Hasan
(74) *Attorney, Agent, or Firm* — Richard A. Baker, Jr.

(57) ABSTRACT

These inventions disclose a non-invasive diagnostic system for intraocular tumor detection using AI-assisted Raman spectroscopy. A monochromatic laser source directs excitation light into intraocular tissue, generating Raman-scattered light that is collected and processed by a spectrometer equipped with a charge-coupled device (CCD). The resulting spectral data is analyzed by an artificial intelligence (AI) processor trained to detect spectral features associated with intraocular tumors. The system identifies known and newly discovered biomarkers, enabling real-time classification, risk stratification, and longitudinal monitoring of tumor evolution. An integrated user interface displays diagnostic results for clinical decision-making. The system supports dynamic updates to the AI model and biomarker database post-deployment, providing adaptive learning capabilities that extend its utility over time. Applications include detection of uveal melanoma, retinoblastoma, metastatic tumors, and related ocular pathologies. The inventions offer high sensitivity and specificity through multi-modal integration, advanced signal processing, and adaptable machine learning frameworks.

30 Claims, 5 Drawing Sheets

(56) References Cited

U.S. PATENT DOCUMENTS

| | | | |
|---|---|---|---|
| 2002/0049389 A1* | 4/2002 | Abreu | A61B 3/0058 |
| | | | 600/318 |
| 2003/0064088 A1* | 4/2003 | Carvalho | A61K 9/0051 |
| | | | 514/169 |
| 2008/0318242 A1* | 12/2008 | Stiharu | G01N 33/5091 |
| | | | 435/6.12 |
| 2009/0147217 A1* | 6/2009 | Molnar | A61B 3/145 |
| | | | 351/246 |
| 2012/0143043 A1* | 6/2012 | Peyman | A61K 41/0028 |
| | | | 600/407 |
| 2012/0257164 A1 | 10/2012 | Zee et al. | |
| 2013/0204421 A1 | 8/2013 | Hayashi et al. | |
| 2014/0118731 A1* | 5/2014 | Ayers | G01J 3/0208 |
| | | | 356/301 |
| 2015/0087973 A1* | 3/2015 | Peyman | A61K 9/127 |
| | | | 600/431 |
| 2017/0020460 A1 | 1/2017 | Leblond | |
| 2018/0136138 A1* | 5/2018 | Zhao | G01N 33/15 |
| 2020/0355553 A1* | 11/2020 | Kersey | G01N 21/6486 |
| 2022/0065791 A1* | 3/2022 | Kersey | G01J 3/44 |
| 2024/0027417 A1* | 1/2024 | Vasefi | G01N 21/55 |
| 2024/0130621 A1* | 4/2024 | Islam | A61B 5/0088 |

OTHER PUBLICATIONS

Erickens, R.J., Jongsma, F.H.M., Wicksted, J.P., Hendrikse, F., March, W.F., Motamedi, M. Raman Spectroscopy in Ophthalmology: From Experimental Tool to Applications In Vivo. Laser Med Sci. 2001:16:236-252. doi: 10.1007/pl100011360.

Farabi, S. F., Yousefi, M.Y., Hajiesmailpoor, Z., Ali Jafarizadeh, Siamak Pedrammehr, Roohallah Alizadehsani, and Juan Manuel Gorriz Saez. Role of artificial intelligence in ocular tumors: A systematic review. Journal of Clinical Oncology, 42, No. 16 suppl., Meeting Abstract, 2024 ASCO Annual Meeting I. https://doi.org/10.1200/JCO.2024.42.16_suppl.e15070.

Habibalahi, A., Bala C., Allende A., Anwer A.G,, Goldys, E.M. Novel automated non invasive detection of ocular surface squamous neoplasia using multispectral autofluorescence imaging. Ocul Surf. 2019;17(3):540-550. doi:10.1016/j.jtos.2019.03.003.

Kapoor R, Walters SP, Al-Aswad LA. The current state of artificial intelligence in ophthalmology. Surv Ophthalmol. 2019;64(2):233-240. doi:10.1016/j.survophthal.2018.09.002.

Koseoglu, N.D., Correa, Z.M., Liu, T.Y. Artificial Intelligence for ocular oncology. Curr. Opin Ophthalmol. 2023;34:437-440. doi: 10.1097/ICU.0000000000000982.

Liu, Y., Chen, S., Xiong, X., et al. Artificial Intelligence guided Raman spectroscopy in biomedicine: Applications in prospects. Online Mar. 19, 2025, 101271. Journal of Pharmaceutical Analysis. Direct https://doi.org/10.1016/j.pho.2025.101271.

Moy, A.J., Feng, X., Nguye,n, H.T.M, Zhang, Y., Sebastian, K.R., Reichenberg, U.S., Tunnell, J.W. Spectral biopsy for skin cancer diagnosis: initial clinical results. Proc. SPIE 10037. Photonics in Dermatology and Plastic Surgery, 1003704 (Feb. 9, 2017; doi: 10.1117/12.2251293.

Xu, M., Chen, Z., Zheng, J., Zhao, Q., Yuan, Z., Artificial intelligence-aided optical imaging for cancer theranostics, Seminars in Cancer Biology, vol. 94, 2023;62-80, ISSN 1044-579X, https://doi.org/10.1016/j.semcancer.2023.06.003. (https://www.sciencedirect.com/science/article/pii/S1044579X23000949).

Shields, J. A., Shields, C. L., Eagle, R. C., & De Potter, P. (1995). Vitreous amyloidosis simulating choroidal melanoma. Archives of Ophthalmology, 113(9), 1161-1164. https://doi.org/10.1001/archopht. 1995.01100090111042.

\* cited by examiner

SOURCE: Austin J. Moy, Xu Feng, Hieu T. M. Nguyen, Yao Zhang, Katherine R. Sebastian, Jason S. Reichenberg, James W. Tunnell, "Spectral Biopsy for Skin Cancer Diagnosis: Initial Clinical Results," Proc. SPIE 10037, Photonics in Dermatology and Plastic Surgery, 1003704 (9 February 2017); DOI: 10.1117/12.2251293

```
┌─────────────────────────────┐
│ SIGNAL ACQUISITION - RAMAN  │
│ SPECTRA COLLECTED FROM      │
│ SUSPECTED UVEAL MASS USING  │
│ ASTABLE, FOCUS BEAM 402     │
└─────────────────────────────┘

┌─────────────────────────────┐
│ SPECTRAL PREPROCESSING - NICE│
│ FILTERING, NORMALIZATION, AND│
│ BASELINE CORRECTION 404     │
└─────────────────────────────┘

┌─────────────────────────────┐
│ FEATURE EXTRACTION -        │
│ IDENTIFICATION OF INFORMATIVE│
│ PEAKS (E.G. AMIDE I, III,   │
│ PHENYLALANINE, LIPID BANDS  │
│ 406                         │
└─────────────────────────────┘

┌─────────────────────────────┐
│ MODEL INTEFERENCE - OUTPUT  │
│ PROBABILITIES FOR MULTIPLE  │
│ SUBTYPE CLASSES WITH VISUAL │
│ INDICATORS 408              │
└─────────────────────────────┘

┌─────────────────────────────┐
│ COMPOSITE DIAGNOSIS - OUTPUT│
│ PROBABILITIES FOR MULTIPLE  │
│ SUBTYPE CLASSES WITH VISUAL │
│ INDICATORS 410              │
└─────────────────────────────┘

┌─────────────────────────────┐
│ FEEDBACK & VALIDATION -     │
│ INCORPORATION OF            │
│ HISTOPATHOLOGY-CONFIRMED    │
│ CASES INTO RETRAINING LOOP  │
│ 412                         │
└─────────────────────────────┘
```

FIG. 4

AI-ASSISTED RAMAN SPECTROSCOPY FOR DIAGNOSIS AND ANALYSIS OF INTRAOCULAR TUMORS

CROSS-REFERENCE TO RELATED APPLICATIONS

This is a priority patent application. This US Patent Application is simultaneously filed with a US Patent Application titled "AI-Assisted Raman Spectroscopy System for Biomarker Analysis of Aqueous Humor" by inventor Michael Reynard, said application incorporated herein by reference in its entirety.

BACKGROUND

Field of the Inventions

These inventions relate to the field of biomedical diagnostics and spectroscopy, specifically the use of AI-Assisted Raman Spectroscopy for the detection, analysis, and monitoring of intraocular tumors, including but not limited to uveal melanoma and retinoblastoma.

Background

Intraocular tumors, such as uveal melanoma and retinoblastoma, present significant challenges in early diagnosis and monitoring. Traditional diagnostic methods, such as imaging techniques and biopsies, are invasive and may lack sensitivity to detect early biochemical changes. Raman spectroscopy, a powerful optical technique that detects molecular vibrations, offers a non-invasive alternative capable of providing real-time biochemical information from ocular tissues.

Raman spectroscopy has been explored for various biomedical applications, including cancer detection and analysis. The technique operates by irradiating tissues with a monochromatic laser, analyzing scattered light to detect shifts in molecular vibrational states. This interaction produces a 'fingerprint' spectrum that reveals the biochemical composition of the tissue.

Despite its potential, Raman spectroscopy faces challenges such as weak signal intensity and interference from surrounding tissues. To overcome the weak signal and interferences, the present inventions incorporate artificial intelligence and machine learning to enhance signal detection, differentiate spectral features, and classify biomarkers associated with intraocular tumors.

BRIEF SUMMARY

In one aspect, a system for diagnosing intraocular tumors using Raman spectroscopy, includes a Raman excitation source configured to direct monochromatic laser light into an eye, a beam splitter positioned to receive backscattered light from the eye and redirect Raman-scattered light, a spectrometer optically coupled to the beam splitter and includes a charge-coupled device (CCD) configured to collect Raman-scattered photons and generate raw spectral data, an artificial intelligence processing unit operatively connected to the spectrometer and configured to analyze said spectral data to identify spectral features indicative of intraocular tumors, and a user interface configured to receive and display diagnostic outputs generated by the artificial intelligence processing unit.

The artificial intelligence processing unit may include a neural network selected from a group consisting of a convolutional neural network (CNN), recurrent neural network (RNN), transformer model, support vector machine (SVM), or random forest classifier. The artificial intelligence processing unit may be further configured to classify spectral data according to tumor type, stage, or progression risk. The artificial intelligence processing unit may be configured to apply signal preprocessing techniques selected from a group consisting of wavelet transform denoising, principal component analysis (PCA), Savitzky-Golay filtering, adaptive baseline correction, spectral normalization, or any combination thereof to enhance quality of Raman spectral data for intraocular tumor analysis. The artificial intelligence processing unit may be configured to identify and classify spectral features associated with one or more biomarkers, including biomarkers known or discovered, such as novel spectral features identified through artificial intelligence-based analysis or clinical research. The artificial intelligence processing unit may utilize a machine learning framework configured to adaptively learn new Raman spectral signatures corresponding to biomarkers not known at a time of system deployment. The system may also include where a spectral database used by the artificial intelligence processing unit is designed to accept updates, training data, or biomarker annotations post-deployment to accommodate newly discovered molecular targets. The predictive modeling may include probabilistic classification of spectral data as corresponding to known or putative biomarkers not previously associated with intraocular tumors. The artificial intelligence processing unit may be further configured to generate personalized diagnostic reports and treatment recommendations by (a) integrating spectral biomarker data with patient-specific clinical history, (b) providing individualized risk assessments and predictive scores for tumor progression, and (c) enhancing clinical decision-making through real-time artificial intelligence-generated insights. The intraocular tumors may include, but are not limited to, uveal melanoma, retinoblastoma, choroidal hemangioma, metastatic tumors, vitreoretinal lymphoma, astrocytic hamartoma, medulloepithelioma, retinal hemangioma, primary intraocular lymphoma, choroidal nevus, iris nevus, iris melanoma, and combined hamartoma of a retina and retinal pigment epithelium. The intraocular tumors may include any neoplastic lesion occurring within ocular tissues, including tumors arising from the retina, uveal tract, optic nerve, retinal pigment epithelium, or intraocular vasculature. The Raman excitation source may emit laser light at a wavelength selected from a group consisting of 785 nm, 830 nm, and 1064 nm. The spectrometer may be configured to detect Raman shifts within a spectral range of approximately 200 $cm^{-1}$ to 3500 $cm^{-1}$. The system may also include a multimodal interface configured to integrate optical coherence tomography (OCT) imaging data with Raman spectral data to enhance diagnostic precision.

The Raman excitation source and spectrometer may be configured in a backscattering geometry, enabling the Raman-scattered light to travel along the same optical path as the monochromatic laser light. The beam splitter may be configured to direct backscattered Raman photons into the spectrometer while allowing monochromatic laser light to pass unobstructed into the eye. The spectrometer may include a diffraction grating configured to spatially separate Raman-shifted light according to vibrational modes of an intraocular tissue sample or a Raman-active constituent therein. The system may be configured to operate in a time-gated detection mode to suppress fluorescence and enhance signal-to-noise ratio. The system may also include optical filters configured to attenuate Rayleigh-scattered light prior to delivery to the CCD. The charge-coupled device (CCD) may be integrated within the spectrometer and may be configured to digitize a dispersed Raman spectrum for artificial intelligence-based analysis. The system may include a surface-enhanced Raman spectroscopy (SERS) capability that is operable with or without confocal optical elements.

The system may also include where the AI interpretation model is trained to identify and classify spectral variability among uveal melanoma subtypes, including choroidal, iris, and ciliary body melanomas, based on molecular patterns associated with melanin content, protein conformation, and oxidative stress markers. The system may also include where the AI model is configured to improve classification accuracy over time through incorporation of newly validated spectral profiles linked to histopathologically and genetically confirmed melanoma subtypes. The system may also include where the Raman spectral analysis is used to detect cytogenetic markers such as BAP1 loss or SF3B1 mutation based on protein misfolding or metabolic band shifts. The system may also include where iris melanomas are differentiated from nevi based on melanin peak intensity and protein conformation signatures. The system may also include where ciliary body tumors are classified based on spatial signal dispersion and vascular-associated Raman features. The system may also include where metastatic intraocular lesions are subtyped based on receptor-specific molecular content including estrogen receptor, progesterone receptor, and HER2-related signatures. The system may also include where the diagnostic algorithm includes comparison with spectral templates from retinoblastoma, hemangioma, and lymphoma to exclude pediatric and benign mimickers. The system may also include where the AI module provides real-time visualization of Raman-acquired data overlaid with anatomical localization. The system may also include where feedback from pathology-confirmed outcomes is used to retrain the AI engine in a supervised learning loop.

In one aspect, a method for diagnosing intraocular tumors using artificial intelligence-assisted Raman spectroscopy, includes directing monochromatic laser light into intraocular tissue, collecting Raman-scattered light from the intraocular tissue and generating spectral data, analyzing the spectral data using an artificial intelligence model to identify biomarkers associated with tumor pathology, and outputting diagnostic information to a user interface.

The method may also include where the artificial intelligence model is configured to update through adaptive or federated learning mechanisms based on ongoing data acquisition and biomarker discovery. The method may also include updating the artificial intelligence model to incorporate new spectral features corresponding to biomarkers subsequently identified through clinical or laboratory research. The method may also include where the artificial intelligence model is trained using a dataset includes Raman spectra of intraocular tissues with and without silicone oil interference, and where the artificial intelligence model performs spectral separation and correction to mitigate signal degradation, further includes use of transfer learning from pre-trained spectral classifiers and an application of unsupervised learning techniques to identify latent spectral features and enhance biomarker detection accuracy. The method may also include where said spectral analysis includes matching against a dynamically expanding biomarker database, including future-identified molecular indicators of intraocular tumor pathology. The method may also include where the diagnostic information comprises the classification of tumor type, stage, risk of metastasis, or treatment response prediction. The method may also include where the Raman-scattered light is filtered to exclude Rayleigh-scattered light before spectral analysis. The method may also include further includes reducing corruption or attenuation of captured Raman spectral data by applying one or more enhancement techniques selected from a group consisting of near-infrared (NIR) excitation, spatially offset Raman spectroscopy (SORS), transmission Raman spectroscopy, resonance Raman spectroscopy (RRS), optical clearing agents (OCAs), enhanced signal collection optics, time-gated Raman spectroscopy, confocal Raman spectroscopy, Savitzky-Golay filtering, wavelet transform denoising, or adaptive smoothing algorithms.

In one aspect, a non-invasive diagnostic apparatus includes a monochromatic light source configured to emit laser light at a wavelength suitable for Raman excitation, a beam path configured to direct laser light into intraocular tissue and to collect Raman-scattered light along a same axis, a beam splitter configured to divert Raman-scattered light toward a detection subsystem, a spectrometer including a diffraction element and a CCD detector configured to generate Raman spectra, and an artificial intelligence module configured to analyze said spectra to detect molecular signatures associated with intraocular tumors.

In one aspect, a diagnostic system for intraocular tumor detection includes a Raman excitation source configured to deliver monochromatic laser light to intraocular tissue, a spectrometer includes a diffraction grating and a charge-coupled device (CCD) configured to collect and digitize Raman-scattered light into spectral data, an artificial intelligence processing module configured to analyze said spectral data to detect molecular features indicative of intraocular tumors and to dynamically incorporate biomarkers discovered after initial deployment of the diagnostic system through retraining or database updates, and a user interface configured to receive and display diagnostic output, including identification of both previously known and newly discovered biomarkers.

In one aspect, a system for performing artificial intelligence-assisted Raman spectroscopy of intraocular tissue, includes: a near-infrared laser source configured to emit excitation light at a wavelength between 785 nm and 830 nm, a fiber optic interface for delivering the excitation light to intraocular structures and collecting Raman-scattered light, a power regulation module configured to constrain optical output at a tissue interface to a range between 1 and 5 milliwatts (mW), one or more sensors configured to monitor real-time laser power and exposure duration, a safety controller operatively coupled to the near-infrared laser source and configured to maintain exposure levels within Maximum Permissible Exposure (MPE) limits as defined by ANSI Z136.1 for ophthalmic applications, and a processing unit configured to analyze Raman spectral data using an artificial intelligence model to classify tissue pathology. The laser power and exposure times are pre-calibrated to remain within ANSI Z136.1 ophthalmic safety guidelines.

The power regulation module may automatically constrain the optical output to below 2 mW during use of signal enhancement techniques, including Surface-Enhanced Raman Scattering (SERS) or confocal Raman configurations. The system may also include an automated interlock mechanism that disables the near-infrared laser source if power exceeds a predefined safety threshold or if contact with ocular tissue is interrupted. The excitation light may be focused to a spot size between 50 m and 200 m to minimize thermal and photochemical tissue damage. The exposure levels may be limited to acquisition durations of less than 10 seconds, includes multiple sub-second scan intervals to maintain compliance with ANSI Z136.1 guidelines. The system may also include a user interface configured to display real-time laser status, exposure parameters, and safety alerts during operation.

In one aspect, an artificial intelligence-assisted Raman diagnostic system for non-invasive analysis of intraocular tissue, the artificial intelligence-assisted Raman diagnostic system includes: a Raman spectroscopy module configured to collect spectral data from an anterior chamber, an artificial intelligence engine configured to process the spectral data and output diagnostic interpretations, a modular software architecture includes one or more independently updateable components selected from: (i) neural network model weights, (ii) signal preprocessing algorithms, (iii) biomarker classification modules, (iv) pharmacologic detection modules, (v) clinical protocol templates, (vi) spectral normalization layers, and (vii) user interface modules, where the artificial intelligence-assisted Raman diagnostic system is configured to receive, validate, and deploy modular updates without requiring retraining or reinstallation of the artificial intelligence-assisted Raman diagnostic system.

The artificial intelligence-assisted Raman diagnostic system may also include a federated learning framework configured to update artificial intelligence model parameters based on distributed training across multiple clinical sites without centralizing patient data. The artificial intelligence engine may be further configured to accommodate updates reflecting changes in Raman spectroscopy instrumentation, including changes to excitation wavelength, detector sensitivity, or optical resolution. The artificial intelligence-assisted Raman diagnostic system may also include where modular updates are performed using version-controlled packages that can be deployed locally or via a secure network. The modular software architecture may enable incorporation of newly discovered biomarkers by adding new spectral templates and corresponding artificial intelligence classification logic without altering pre-existing biomarker interpretations. The artificial intelligence-assisted Raman diagnostic system may also include where pharmacologic detection modules are updatable to reflect changes in therapeutic compounds, drug formulations, or Raman-active pharmaceutical agents introduced into clinical practice. The artificial intelligence-assisted Raman diagnostic system may also include where clinical protocol modules are updatable to align with revised diagnostic criteria, treatment guidelines, or regulatory standards. The artificial intelligence-assisted Raman diagnostic system may also include where updates to preprocessing algorithms include adjustments to baseline correction, spectral smoothing, and normalization in response to new Raman spectrometer configurations. The artificial intelligence-assisted Raman diagnostic system may also include where updates to a user interface module include enhancements to explainability tools, display formatting, or workflow integration without modifying the artificial intelligence-assisted Raman diagnostic system. The artificial intelligence-assisted Raman diagnostic system may also include where a compliance module is configured to receive security and privacy updates to ensure adherence to applicable data protection regulations without disrupting system diagnostics.

In one aspect, a non-invasive diagnostic system for characterizing intraocular tumors, includes: a Raman spectroscopy module configured to acquire molecular vibrational spectra from ocular tissue, an artificial intelligence engine trained on spectral datasets from histopathologically confirmed intraocular tumors, and a diagnostic output interface configured to assign probability scores to tumor subtypes including but not limited to melanomas, metastatic lesions, lymphomas, and pediatric ocular tumors.

The non-invasive diagnostic system may also include where the artificial intelligence engine is configured to distinguish between neoplastic and non-neoplastic intraocular abnormalities based on spectral features associated with melanin, nucleic acids, protein conformation, lipid composition, and oxidative stress markers. The non-invasive diagnostic system may also include where the artificial intelligence engine is further trained to identify non-neoplastic ocular lesions that mimic tumors, including granulomatous uveitis, sarcoidosis, infectious chorioretinitis, and idiopathic inflammatory pseudotumors. The non-invasive diagnostic system may also include where the molecular vibrational spectra are used to classify metastatic intraocular lesions according to their systemic origin and molecular subtype, including breast cancer subtypes such as Luminal A, Luminal B, HER2-enriched, and triple-negative. The non-invasive diagnostic system may also include where the artificial intelligence engine is trained to distinguish between pediatric intraocular tumors, including retinoblastomas and medulloepitheliomas, based on their Raman spectral characteristics. The non-invasive diagnostic system may also include where the artificial intelligence engine provides a differential diagnosis between benign vascular lesions and neoplastic lesions based on extracellular matrix and vascular-related Raman features. The non-invasive diagnostic system may also include where inflammatory and infectious ocular conditions are differentiated from malignancies using a spectral database includes granulomatous inflammation, viral chorioretinitis, toxoplasmosis, and autoimmune pseudotumors. The non-invasive diagnostic system may also include where the diagnostic output interface includes a visual user interface with region-specific diagnostic overlays and confidence scores for tumor versus mimicker classification. The non-invasive diagnostic system may also include where the diagnostic output interface is configured to include differential probabilities for neoplastic, inflammatory, and infectious etiologies based on Raman spectral profiles.

In one aspect, a system for real-time molecular subtyping of intraocular lesions includes: (a) a Raman spectrometer configured to non-invasively acquire vibrational spectra from intraocular regions, (b) a trained artificial intelligence engine configured to classify the vibrational spectra into neoplastic subtypes, including melanomas, metastases, pediatric tumors, and lymphomas, and non-neoplastic mimickers including inflammatory and infectious conditions, and (c) a feedback-enabled diagnostic interface configured to display classification probabilities and suggest appropriate clinical pathways. Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

FIG. 4 illustrates a flowchart of an AI-based Raman subtype classification.

Figure 1:
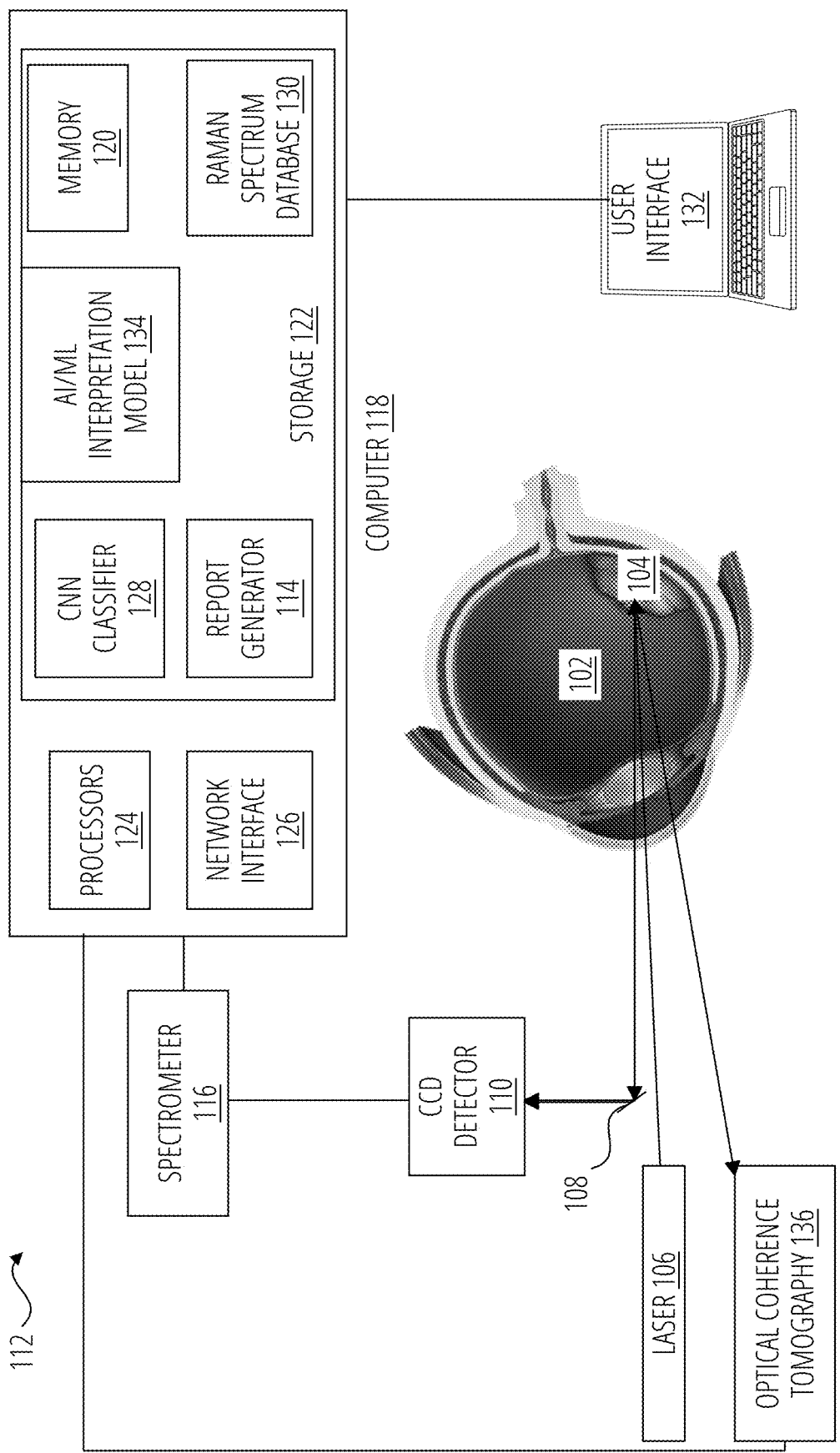
FIG. 1 depicts a representative system architecture of the AI-enhanced Raman spectroscopy diagnostic system.

Together, these figures underscore the inventions' technical foundation and clinical utility by illustrating how light-based tissue interrogation, spectral data acquisition, and AI-driven analysis are integrated into a cohesive diagnostic platform.

DETAILED DESCRIPTION

The present inventions provide a comprehensive 112 and method for diagnosing and monitoring intraocular tumors 104 using Raman spectroscopy enhanced by artificial intelligence (AI). The AI-enhanced Raman spectroscopy diagnostic system 112 may comprise a monochromatic laser 106 excitation source that delivers light to intraocular tissue, where Raman-scattered photons are generated by interaction with molecular structures, including tumor biomarkers. These photons may travel back along the same optical path and may be redirected by a beam splitter 108 into a spectrometer 116. A charge-coupled device 110 (CCD) within (in some embodiments) the spectrometer 116 may collect the Raman signal, which is processed and digitized to produce raw spectral data. See FIG. 1.

An Artificial Intelligence/Machine Learning interpretation model 134 ("AI/ML interpretation model 134") may analyze the spectral data to identify molecular patterns associated with benign or malignant tumors 104. The AI/ML interpretation model 134 may incorporate deep learning algorithms and support adaptive and federated learning models, allowing it to dynamically incorporate newly discovered biomarkers post-deployment. A user interface 132 delivers real-time diagnostic feedback to clinicians, including tumor type, stage, metastatic risk, and treatment response indicators.

The inventions are designed to accommodate multiple forms of intraocular tumors 104, including uveal melanoma, retinoblastoma, metastatic tumors, and other rare ocular tumors, distinguishing the tumors 104 from amyloid fibrils and normal ocular cells. It may further integrate Optical Coherence Tomography 136 ("OCT") imaging to enhance spatial targeting and diagnostic accuracy. Advanced signal preprocessing techniques, including wavelet denoising and principal component analysis, improve the quality and interpretability of spectral data, especially in the presence of silicone oil or autofluorescence.

The inventions offer a scalable, adaptable platform for ocular oncology diagnostics, supporting ongoing updates to biomarker databases and clinical workflows through cloud-based or localized AI training. An AI-enhanced Raman spectroscopy diagnostic system 112 applied to the analysis of intraocular tumors 104 is safe, non-invasive, accurate, cost-effective, and delivers results within minutes. By combining molecular-level spectroscopy with intelligent analysis and user-friendly outputs, the inventions set a new standard for precision diagnostics in ophthalmology Brief Description of Methodology The system architecture of the AI-enhanced Raman spectroscopy diagnostic system 112 is made of the following components. A Raman excitation source (e.g. laser 106) configured for in-vivo imaging of intraocular tissues through non-invasive techniques. The delivery of a monochromatic light, generally a laser 106, into the eye 102 through the imaging system. A detector may be configured to capture Raman scattered light returned along the same optical path, and convert it into spectral data. A charge-coupled device 110 (CCD) coupled with the spectrometer 116 may divert raw spectral data to the AI/ML interpretation model 134, which analyzes the spectral signature to detect biomarkers associated with intraocular tumor 104. The AI/ML interpretation model 134 is integrated with AI-driven algorithms, including deep learning models, convolutional neural networks (CNNs), support vector machines (SVM), reinforcement learning models, and hybrid AI systems to analyze Raman spectra, identify spectral patterns, and classify biomarkers associated with intraocular tumor 104. A user interface 132 providing real-time feedback and diagnostic reports to clinicians. AI-Based Analysis using an AI system that utilizes machine learning techniques such as deep learning, support vector machines (SVM), and neural networks to enhance the detection and classification of biomarkers.

The AI-enhanced Raman spectroscopy diagnostic system 112 architecture may apply predictive analytics to differentiate between various intraocular tumor 104 including metastatic tumors, uveal melanoma, retinoblastoma, and benign conditions based on spectral signatures. Studies have reported sensitivity and specificity values ranging between 85% and 98%, depending on the type of tumor and the AI/ML interpretation model 134 used. Precision and recall scores are typically high, over 90% in many cases, particularly when the AI/ML interpretation model 134 is trained with large, high-quality datasets. AI-assisted Raman spectroscopy can distinguish between malignant and benign tissues with high precision, which is crucial for diagnostic purposes.

In addition, the AI-enhanced Raman spectroscopy diagnostic system 112 architecture identifies early-stage biomarkers indicative of tumor 104 formation or malignant progression. The AI-enhanced Raman spectroscopy diagnostic system 112 continuously improves diagnostic accuracy through adaptive learning models. It refines treatment recommendations by analyzing biomarker responses to therapeutic interventions.

AI-Based Framework and Training Strategy: The AI/ML interpretation model 134 utilizes various models for spectral analysis, including Deep Learning (CNNs, Recurrent Neural Networks—RNNs) to extract spectral features and enhance classification accuracy. It also uses Support Vector Machines (SVM) for the classification of distinct biomarkers associated with uveal melanoma, retinoblastoma, and benign conditions. The strategy also includes Reinforcement Learning for adaptive optimization of diagnostic models over time based on new data inputs, and Transfer Learning to apply pre-trained models from other domains for enhanced diagnostic accuracy. Federated Learning is used to enable the AI/ML interpretation model 134 training across decentralized data sources, preserving patient privacy.

Biomarker Detection: The inventions cover biomarkers across a broad spectral range (200 $cm^{-1}$ to 3500 $cm^{-1}$) to ensure inclusion of future-discovered biomarkers. These biomarkers may include Protein modifications, lipid composition changes, extracellular matrix alterations, oxidative stress indicators, and other Raman-active molecular changes, as well as AI/ML interpretation model 134 trained on a Raman spectrum database 130 from healthy and diseased tissues to enhance detection accuracy, and Continuous learning systems that automatically update biomarker classifications based on newly acquired data.

Hardware Configurations: The AI-enhanced Raman spectroscopy diagnostic system 112 supports various hardware implementations, including: Portable Raman devices for in-office screening, wearable Raman devices for continuous monitoring, integrated smartphone-based Raman devices for at-home monitoring and remote diagnostics, implantable Raman sensors for real-time intraocular tumor detection, hybrid imaging systems combining Raman spectroscopy with other modalities such as Optical Coherence Tomography 136, and cloud-based AI/ML interpretation model 134 for remote spectral analysis.

Pharmaceutical Monitoring Applications: The AI-enhanced Raman spectroscopy diagnostic systems 112 enable precise monitoring of treatment efficacy by analyzing changes in spectral biomarkers before, during, and after therapeutic interventions. This includes detecting early responses to chemotherapy, radiation therapy, and targeted drug treatments, providing personalized treatment recommendations based on Raman biomarker profiles, monitoring biomarker evolution overtime to assess treatment effectiveness.

AI-Based Predictive Analytics: The AI-enhanced Raman spectroscopy diagnostic system 112 may generate personalized diagnostic reports (with the report generator 114) and treatment recommendations by integrating spectral biomarker data with patient-specific clinical history, providing risk assessments and predictive scores for tumor progression, enhancing clinical decision-making through real-time AI analysis, and continuously adapting AI models to accommodate newly discovered biomarkers and evolving disease patterns.

AI-Assisted Raman Spectroscopy System

The AI-enhanced Raman spectroscopy diagnostic system 112 described herein provides a comprehensive and non-invasive diagnostic solution for the detection, classification, and monitoring of intraocular tumors 104. These tumors 104—arising from the retina, uveal tract, optic nerve, or retinal pigment epithelium—may include uveal melanoma, retinoblastoma, choroidal hemangioma, and other neoplastic lesions. The AI-enhanced Raman spectroscopy diagnostic system 112 utilizes Raman spectroscopy to identify tumor-associated molecular biomarkers by capturing vibrational signals specific to various biochemical constituents, including proteins (e.g., S100, Ki-67, HMB-45), lipids (e.g., cholesterol, phosphatidylcholine, sphingomyelin), nucleic acids, melanin, and carotenoids.

The process begins with the projection of monochromatic laser light-typically at wavelengths such as 785 nm, 830 nm, or 1064 nm into the eye 102 using a Raman excitation source suck as the laser 106. These wavelengths are preferred because they minimize fluorescence from melanin and pigments in the retina and choroid, and penetrate deeper into tissue while maintaining safe power levels of less than 1 mW for safety reasons.

The laser 106 may be administered by a Raman probe that has a coaxial group of fibers for video guidance transmission and a HeNe or red diode aiming beam for the operator to guide the laser 106 to its intended target. The Raman probe is placed on an anesthetized cornea area, either in gentle contact or at a non-contact working distance of a few millimeters from the surface of the eye 102.

The laser light interacts with ocular tissue, particularly targeting regions that may harbor tumors 104 such as the choroid or retina. The Raman-scattered photons generated from this interaction travel back along the incident light path and are diverted by a beam splitter 108 toward a spectrometer 116. Within the spectrometer 116 (in some embodiments), a charge-coupled device 110 (CCD) and diffraction grating capture and digitize the scattered light, producing raw spectral data. For comparative analysis of an intraocular tumor 104, reference spectral data in the Raman spectrum database 130 may be sourced from: (i) an established database of Raman spectra obtained from histologically normal intraocular tissues; (ii) spectroscopic measurements of unaffected regions within the same ocular tissue; or (iii) corresponding anatomical regions in the contralateral eye, provided such regions are clinically verified to be free of pathology.

To extract clinically meaningful information from the acquired spectra, the AI-enhanced Raman spectroscopy diagnostic system 112 may incorporate advanced signal preprocessing methods. These include baseline correction, wavelet transform denoising, Savitzky-Golay filtering, and spectral normalization. These processes remove noise, fluorescence, and other signal distortions that may otherwise obscure diagnostic features.

Artificial Intelligence (AI) algorithms are central to the analysis of preprocessed Raman spectra. Convolutional Neural Networks (CNNs) are employed for automated feature extraction, adept at recognizing subtle spectral patterns associated with malignancy, such as increased melanin, disrupted collagen organization, or amplified nucleic acid signals. The hierarchical architecture of CNNs enables them to learn increasingly complex features across network layers.

Following feature extraction, classification is performed using supervised machine learning models such as Support Vector Machines (SVMs), Random Forests, and optionally Recurrent Neural Networks (RNNs). This multi-model ensemble ensures high diagnostic accuracy by capturing both spatial and spectral relationships in tumor tissue. In scenarios with limited training data, transfer learning techniques may be utilized to enhance model performance.

This AI/ML interpretation model 134 differentiates between benign and malignant intraocular tumors 104 by leveraging the unique spectral "fingerprints" extracted from the tissue, ensuring robust and reproducible results.

To address the diversity and heterogeneity of intraocular tumors 104, the system may incorporate transfer learning strategies. These allow the AI/ML interpretation model 134 to leverage knowledge from previously analyzed datasets to adapt to new spectral patterns with minimal retraining. Additionally, unsupervised learning methods—such as Principal Component Analysis (PCA) and Independent Component Analysis (ICA)—are utilized to uncover latent spectral features and facilitate biomarker discovery.

The diagnostic capabilities of the AI-enhanced Raman spectroscopy diagnostic system 112 extend beyond static analysis. The AI-enhanced framework supports real-time feedback, providing clinicians with immediate classification results, risk stratification, and suggested follow-up actions. In the case of unknown spectral patterns, the AI-enhanced Raman spectroscopy diagnostic system 112 flags this data for further analysis and model refinement. A biomarker panel approach is employed to improve diagnostic sensitivity and specificity, recognizing that multiple biomarkers offer greater predictive value than isolated signals.

The 112 AI-enhanced Raman spectroscopy diagnostic system 112 may also be designed for longitudinal use. Spectral data obtained from repeat examinations are used to track tumor 104 progression or response to treatment. In certain configurations, wearable or portable Raman devices integrated with cloud-based AI systems enable continuous monitoring and remote diagnostics. These devices transmit data securely for real-time processing and feedback through an intuitive user interface 132.

In challenging diagnostic environments—such as cases involving signal attenuation due to ocular media or silicone oil interference—the AI-enhanced Raman spectroscopy diagnostic system 112 may apply specialized correction techniques. These specialized correction technique may include adaptive smoothing, signal enhancement optics, optical clearing agents, and confocal Raman configurations. The AI/ML interpretation model 134 is trained on datasets that include both standard and interfered spectra, enabling accurate discrimination and signal recovery.

tumor classification, confidence scores, and tailored treatment recommendations. As additional biomarkers are discovered, the system's database may be continuously updated through adaptive learning protocols, ensuring ongoing accuracy and relevance.

This AI-enhanced Raman spectroscopy diagnostic system 112 therefore represents a transformative platform for intraocular tumor 104 diagnostics, offering high sensitivity, specificity, adaptability, and non-invasiveness in a single, integrated solution.

TABLE 1

Summary of AI-Assisted Enhancement of Raman Spectroscopy for Intraocular Tumors

| Method | Description | Effect |
| --- | --- | --- |
| Noise Reduction | AI algorithms, such as Wavelet Transform Denoising, Autoencoders, and GANs (Generative Adversarial Networks), can effectively filter out unwanted noise from raw spectral data. | This enhancement is especially beneficial for in-vivo detection where biological noise can interfere with Raman signals. |
| Baseline Correction & Normalization | AI techniques are applied to correct baseline distortions caused by fluorescence, tissue scattering, and other interferences. | Methods like Polynomial Fitting, Deep Learning-Based Curve Fitting, and Adaptive Baseline Subtraction improve spectral clarity. |
| Feature Extraction Selection | Deep learning models, such as Convolutional Neural Networks (CNNs), are effective at automatically extracting relevant features from spectral data. | Techniques like Principal Component Analysis (PCA), t-Distributed Stochastic Neighbor Embedding (t-SNE), and Independent Component Analysis (ICA) help reduce dimensionality while preserving important information. |
| Signal Enhancing via Spectral Unmixing | AI models can separate overlapping spectral signatures of various tissues. | Enhance the ability to detect weak signals from tumors in the posterior uvea and retina. |
| Super-Resolution Analysis | AI techniques can simulate higher-resolution spectral data from low-resolution measurements. | Improve detection sensitivity and accuracy. |
| Data Augmentation & Transfer Learning | When limited data are available, AI models can be trained using augmented data, enhancing robustness and generalization. | Transfer learning from models trained on similar tasks (e.g., other tissue types) can be applied to improve accuracy. |
| Automated Classification & Diagnosis | Trained AI models can provide real-time classification of benign versus malignant tissues based on spectral patterns | Enhance diagnostic efficiency and reliability. |

Furthermore, the AI-enhanced Raman spectroscopy diagnostic system 112 may integrate Optical Coherence Tomography 136 for multimodal imaging, allowing structural and biochemical data to be correlated. This hybrid approach may improve tumor 104 localization and characterization. Spectral data acquired before the insertion of optical media, such as silicone oil, can also be digitally corrected via spectral subtraction algorithms, enhancing clarity.

The final diagnostic report may be delivered via the A-enhanced Raman spectroscopy diagnostic system's 112 user interface 132, and may include identified biomarkers, To enhance diagnostic yield in intraocular tumor analysis, A-enhanced Raman spectroscopy diagnostic systems 112 may incorporate advanced signal enhancement techniques that enable deeper tissue interrogation, selective amplification of tumor-specific chromophores, and noise suppression in high-scattering environments. These techniques are particularly relevant in applications targeting the iris, ciliary body, choroid, and retina. The following table summarizes signal enhancement strategies adapted for intraocular tumor analysis:

TABLE 2

Signal Enhancement Techniques for Raman Spectroscopy of Intraocular Tumors

| Technique | Description |
| --- | --- |
| Near-Infrared (NIR) Excitation | Uses 785 nm, 830 nm, or 1064 nm lasers to reduce auto-fluorescence and melanin absorption, facilitating signal penetration into pigmented and deep ocular tissues. |
| Resonance Raman Spectroscopy (RRS) | Excitation wavelength is matched to absorption bands of tumor-specific chromophores (e.g., melanin, heme), selectively enhancing Raman signals from malignant tissues. |
| Confocal Raman Spectroscopy (CRS) | A confocal pinhole setup eliminates out-of-focus light, enabling depth-resolved Raman scans of intraocular masses while improving spatial resolution and signal-to-noise ratio. |
| Enhanced Collection Optics | Incorporates fiber probes, GRIN lenses, or aspheric optics to maximize photon collection from deep or posterior segment lesions. |
| Time-Gated Raman Spectroscopy | Utilizes ultrashort pulsed lasers and gated detectors to suppress background fluorescence from adjacent tissues, improving contrast in melanotic or vascular tumors. |
| Optical Clearing Agents (OCAs) | Biocompatible compounds may temporarily reduce optical iscattering, mproving visualization and Raman signal fidelity through ocular media such as the sclera or vitreous. |
| Swept Source Raman Spectroscopy (SSRS) | Applies tunable excitation or detection wavelengths to dynamically scan across spectral regions of interest, enhancing specificity for layered or spectrally complex intraocular tumors. |

These enhancements support precise molecular characterization of intraocular tumors in vivo, aiding in early detection, classification, and treatment guidance. When paired with A-driven classification, these methods allow for real-time, non-contact molecular imaging that complements traditional OCT, ultrasound, and fundus imaging techniques.

AI-based preprocessing methods may be employed to improve signal quality. Techniques such as noise filtering, baseline correction and spectral normalization could be applied using deep learning frameworks to ensure data consistency and reliability. Furthermore, transfer learning may be utilized to enhance model robustness and generalization when applied to new datasets.

The AI-enhanced Raman spectroscopy diagnostic system 112 offers significant advantages over conventional diagnostic methods, including higher sensitivity, non-invasiveness, and the ability to detect ocular tumors 104 at earlier stages. Table 3 summarizes the application of AI in the Diagnosis of Ocular Tumors.

TABLE 3

Application of AI in Diagnosis of Ocular Tumors

| Description | Method | Effect |
| --- | --- | --- |
| Multi-Modal Data Integration | Combining Raman spectral data with other diagnostic imaging modalities (e.g., OCT, MRI, Ultrasound) using AI to improve diagnostic accuracy. | Fusion models can enhance the robustness of diagnosis by integrating structural, biochemical, and morphological information. |
| Tumor Margin Delineation | AI can be trained to identify and segment tumor boundaries from Raman spectral maps with high precision. | Useful for surgical planning and assessing tumor margins in cases where conventional imaging lacks clarity. |
| Predictive Modeling for Prognosis | AI algorithms can analyze longitudinal spectral data to predict tumor progression, aggressiveness, and potential metastasis. | This can be achieved by training models on large datasets of Raman spectra linked to clinical outcomes. |
| Biomarker Discovery | Deep learning models, such as Transformer Networks and Deep Belief Networks (DBNs), can uncover novel biomarkers related to malignancy that may be invisible to traditional statistical methods. | Spectral features linked to specific genetic mutations (e.g., GNAQ, GNA11) can enhance diagnostic precision. |
| Real-Time Diagnostic Feedback | Raman spectroscopy devices to provide immediate classification of tissue states during examinations. | Real-time feedback can reduce diagnostic delays and improve patient outcomes. |
| Adaptive Learning Systems | Continuous learning from new clinical data enhances the adaptability of the AI system to newly discovered biomarkers and evolving diagnostic criteria. | |

AI System Maintenance and Modular Updates

The disclosed AI-enhanced Raman spectroscopy diagnostic system 112 may be designed for long-term clinical utility through a modular, maintainable architecture that supports periodic updates and adaptive learning. In real-world applications, maintaining system accuracy and clinical relevance may require not only ongoing AI retraining but also careful coordination with updates in Raman spectroscopy hardware and signal acquisition protocols. (Table 4: AI System Maintenance and Modular Updates).

Spectral Calibration Modules are updated to reflect revised baseline behaviors or extended wavenumber detection ranges.

Preprocessing Pipelines are retrained to denoise or normalize spectra acquired under different optical conditions.

Biomarker Signature Libraries are expanded to reflect improvements in detection sensitivity or resolution for certain Raman peaks.

TABLE 4

AI System Maintenance and Module Updates

| Description | Steps |
| --- | --- |
| Monitoring and Performance Evaluation | Continuously track AI model performance using diagnostic accuracy, confidence scores, and clinician feedback. Identify drifts, anomalies, or degradations in diagnostic output. |
| Trigger for Update | Detection of new biomarkers or Raman spectral shifts. Discovery of new pharmaceutical agents or therapeutic regimes. Changes in Raman hardware (e.g., new laser wavelength, resolution). Updated clinical guidelines or diagnostic criteria. Performance drop or user feedback suggesting recalibration. |
| Modular Update Preparation | Isolate affected modules (e.g., biomarker recognition, spectral preprocessing, pharmacologic interpretation). Integrate new spectral data, metadata schemas, or Raman system parameters. Apply augmentation, normalization, and synthetic training strategies to new data. |
| Model Retraining and Validation | Fine-tune AI models using updated datasets. Employ stratified validation, cross-clinic testing, and comparison against baseline models. Update AI components in modular form without requiring full system replacement. |
| Regulatory and Safety Checks | Perform validation checks aligned with clinical safety standards (e.g., ISO, FDA, ANSI). Document version history and model interpretability logs. Verify compliance with privacy and federated learning standards. |
| Deployment of Updated Modules | Push update to clinical systems via secure cloud or on-device update. Maintain backward compatibility and optional rollback features. Notify clinicians of update scope and relevance. |
| Post-Deployment Monitoring | Collect post-update performance data in real time. Solicit user feedback to verify usability, interpretability, and trust. Log new data for future training cycles. |

Need for Ongoing Maintenance

Artificial intelligence models are not static; their performance can degrade over time due to changes in patient demographics, evolving clinical standards, or shifts in disease patterns. Additionally, the discovery of novel biomarkers, changes in drug usage patterns, or the emergence of new Raman-detectable substances all necessitate model updates.

Equally important is the evolution of the Raman spectroscopy subsystem itself. As hardware improves—through enhanced detectors, altered laser parameters, or expanded spectral resolution—the characteristics of raw spectral data may shift. These changes can affect signal intensity, baseline behavior, or noise profiles, leading to subtle differences in the spectral inputs that the AI must interpret. Without alignment, these hardware improvements may outpace the capabilities of pre-trained models, leading to decreased diagnostic reliability or misclassification.

AI-Raman Synchronization

To address this, the AI-enhanced Raman spectroscopy diagnostic system 112 architecture may be designed with modular components that can be independently updated and synchronized with changes in the Raman acquisition platform. For instance:

Hardware Metadata Parsers allow the AI to adjust its expectations dynamically based on the specific spectrometer model or software version in use.

These updates could be governed by a robust version control and validation framework to ensure traceability, consistency, and compliance with regulatory standards. Every AI update—whether initiated due to data drift, biomarker discovery, or Raman hardware modification—may be accompanied by performance benchmarking, regression testing, and documentation.

Implementation of Modular Updates

Clinical Integration: Updates could be applied through secure interfaces, enabling both cloud-based and offline clinical environments to remain up-to-date.

Federated Learning Support: Allows decentralized training using anonymized local datasets while maintaining global model consistency.

Changelog Auditing: Each update could be tracked with detailed release notes, model deltas, and performance comparisons.

By aligning AI model maintenance with Raman system upgrades, the disclosed diagnostic platform could ensure that its molecular interpretation engine remains harmonized with signal acquisition capabilities. This coordinated approach enables the AI-enhanced Raman spectroscopy diagnostic system 112 to preserve accuracy, remain responsive to technological advances, and deliver actionable, real-time diagnostics with consistent reliability.

AI System Maintenance and Modular Updates

To maintain peak performance and clinical relevance, the AI-enhanced Raman spectroscopy diagnostic system 112 could be designed with modular update architecture. This allows for individual components—such as AI models, data inputs, user interfaces, and instrumentation protocols—to be independently maintained and upgraded over time without disrupting the entire system.

Model Performance and Retraining

As the AI-enhanced Raman spectroscopy diagnostic system 112 collects more real-world data, periodic retraining of the AI/ML interpretation model 134 may become necessary to prevent model drift, improve generalizability, and accommodate new patient populations. These updates could enhance diagnostic accuracy and expand the applicability of the AI engine across diverse clinical settings. Modular updates may enable the seamless integration of updated neural network weights, new feature extraction methods, or improved interpretive logic, all without requiring a complete system overhaul.

Clinical Dataset Expansion

Over time, additional biomarker data may emerge from clinical research or multi-center collaborations. These datasets may include new disease presentations, racial or ethnic subpopulations, and biomarker variability due to environmental or pharmacologic exposures. The modular structure allows these data to be imported for retraining or for supervised fine-tuning, ensuring that the system continues to reflect evolving clinical realities.

Integration of New Biomarkers

As novel biomarkers are identified—whether proteins, cytokines, metabolites, or vesicle-bound signals—the system's AI/ML interpretation model 134 can be updated with new spectral templates and diagnostic classifications. Each new biomarker module includes its unique Raman spectral signature, interpretive thresholds, and clinical context. This dynamic integration expands diagnostic scope without altering existing validated functions.

Pharmacologic Detection Updates

The AI-enhanced Raman spectroscopy diagnostic system 112 may also be engineered to detect therapeutic agents in the vitreous, retina, and choroid, such as prostaglandin analogs, antimetabolites, chemotherapy drugs, anti-tumor antibiotics, alkylating agents, and investigational drugs. As new compounds are introduced into clinical practice, corresponding modules can be added to the AI/ML interpretation model 134 to recognize their Raman features and estimate concentrations. These pharmacologic updates refine treatment monitoring and compliance analysis.

Changes in Clinical Protocols

The modular design may ensure adaptability when clinical practice patterns change—whether in response to revised diagnostic criteria, new treatment guidelines, or evolving screening protocols. Updates to decision thresholds, interpretive logic, or user prompts can be delivered as independent software modules without necessitating hardware changes or model retraining.

Hardware or Software Infrastructure Enhancements

If the Raman spectrometer 116 undergoes hardware updates—such as changes in laser wavelength, detector sensitivity, or optical resolution—the 134 may be configured to accommodate new signal characteristics. Signal preprocessing modules and spectral normalization layers can be adjusted or replaced as plug-in components to match the updated hardware profile. Similarly, updates in the user interface 132 or data storage 122 architecture are handled modularly to preserve workflow stability.

Coordination with Raman Spectroscopy Improvements

As Raman instrumentation improves—introducing better signal-to-noice ratios, enhanced optical filtering or new excitation protocols—the AI/ML interpretation model 134 may require concurrent updates to maintain interpretive accuracy. These include recalibration of signal preprocessing algorithms, normalization protocols, and spectral resolution parameters. The modular framework ensures that the AI adapts in parallel with advancements in the AI-enhanced Raman spectroscopy diagnostic system 112.

Security and Compliance Updates

Finally, as privacy laws and clinical data standards evolve (e.g., General Data Protection Regulation ("GDPR"), Health Insurance Portability and Accountability Act ("HIPAA"), US Food and Drug Administration ("FDA") guidance), the modular design may allow updates to be delivered to security, logging, and audit modules. These changes enhance compliance without affecting diagnostic performance.

Adjunctive Use of Raman Spectroscopy and AI with Optical Coherence Tomography

Optical Coherence Tomography 136 is recognized as a useful method for high-resolution imaging of retinal layers and choroid. Optical Coherence Tomography 136 is useful for detecting and defining tumors 104 in the posterior segment of the eye 102. Optical Coherence Tomography 136 combined with Raman spectroscopy can improve diagnostic accuracy and staging of ocular tumors 104, particularly ocular melanoma. Raman spectral data obtained prior to placement of silicone oil in the vitreous cavity can be modified by spectral subtraction to further minimize interference and enhance diagnostic accuracy.

Quantification of Biomarkers Using AI-Assisted Raman Spectroscopy

Biomarkers may be accurately quantified using AI-assisted Raman spectroscopy by analyzing the intensity and distribution of characteristic Raman peaks corresponding to specific molecules. Each biomarker exhibits distinct spectral features, such as peak positions, intensity ratios, and band shapes, which serve as molecular fingerprints for identification and quantification.

The quantification process begins with acquiring high-resolution Raman spectra from the target tissue, followed by preprocessing steps that include baseline correction, denoising, and spectral normalization. These preprocessing techniques are optimized by AI algorithms to enhance the signal-to-noise ratio and improve spectral quality.

Once the spectral data is preprocessed, convolutional neural networks (CNNs) are employed to extract relevant features from the spectra, identifying the biomarkers based on their unique spectral signatures. The AI/ML interpretation model 134 may utilize pattern recognition and spectral matching to isolate and quantify each biomarker based on the intensity of its Raman peaks.

Additionally, regression models, such as deep learning-based regression networks or support vector regression (SVR), can be applied to establish quantitative relationships between spectral features and biomarker concentrations. By training the models on known concentrations of biomarkers, the AI/ML interpretation model 134 can accurately predict the concentration levels of biomarkers present in newly acquired spectra. Newly acquired Raman spectra are subjected to a validation process prior to inclusion in the system's diagnostic database. This process involves comparing the spectral features of each new dataset to established reference spectra using similarity scoring algorithms and statistical thresholding. Expert review or histopathologic confirmation may be employed to verify the corresponding diagnosis. Only spectra that meet predefined quality metrics—such as signal-to-noise ratio, alignment with known biomarker patterns, and confirmed clinical classification—are incorporated into the 134. This ensures that the diagnostic engine evolves with high-integrity data, maintaining accuracy and robustness as new conditions or variants are encountered.

The AI-enhanced Raman spectroscopy diagnostic system 112 provides real-time quantification of biomarkers, allowing for precise monitoring of tumor 104 progression and treatment response. This approach enables the development of non-invasive diagnostic tools that offer high sensitivity and specificity, thereby enhancing clinical decision-making for intraocular tumors 104.

Methodology for AI-Assisted Raman Spectroscopy for Detection and Analysis of Intraocular Tumor Biomarkers One embodiment of a Step-by-Step Methodology of Using AI-Assisted Raman Spectroscopy for Detection and Analysis of Biomarkers for Specific Ocular Tumors 104 is listed below.

The process may begin with the patient visiting a clinical facility or utilizing a portable Raman spectroscopy device at home.

The deployment of the AI-enhanced Raman spectroscopy diagnostic system 112 for intraocular tumor 104 detection may involve a multi-stage process designed to ensure maximum diagnostic accuracy and efficiency. The first stage may involve the acquisition of high-quality Raman spectra from intraocular tissues, either through in-vivo or ex-vivo analysis. For non-invasive procedures, a handheld or integrated Raman spectroscopic device equipped with a specialized Raman probe is employed to capture spectral data through the corneal window without causing patient discomfort or requiring surgical intervention.

Figure 3:
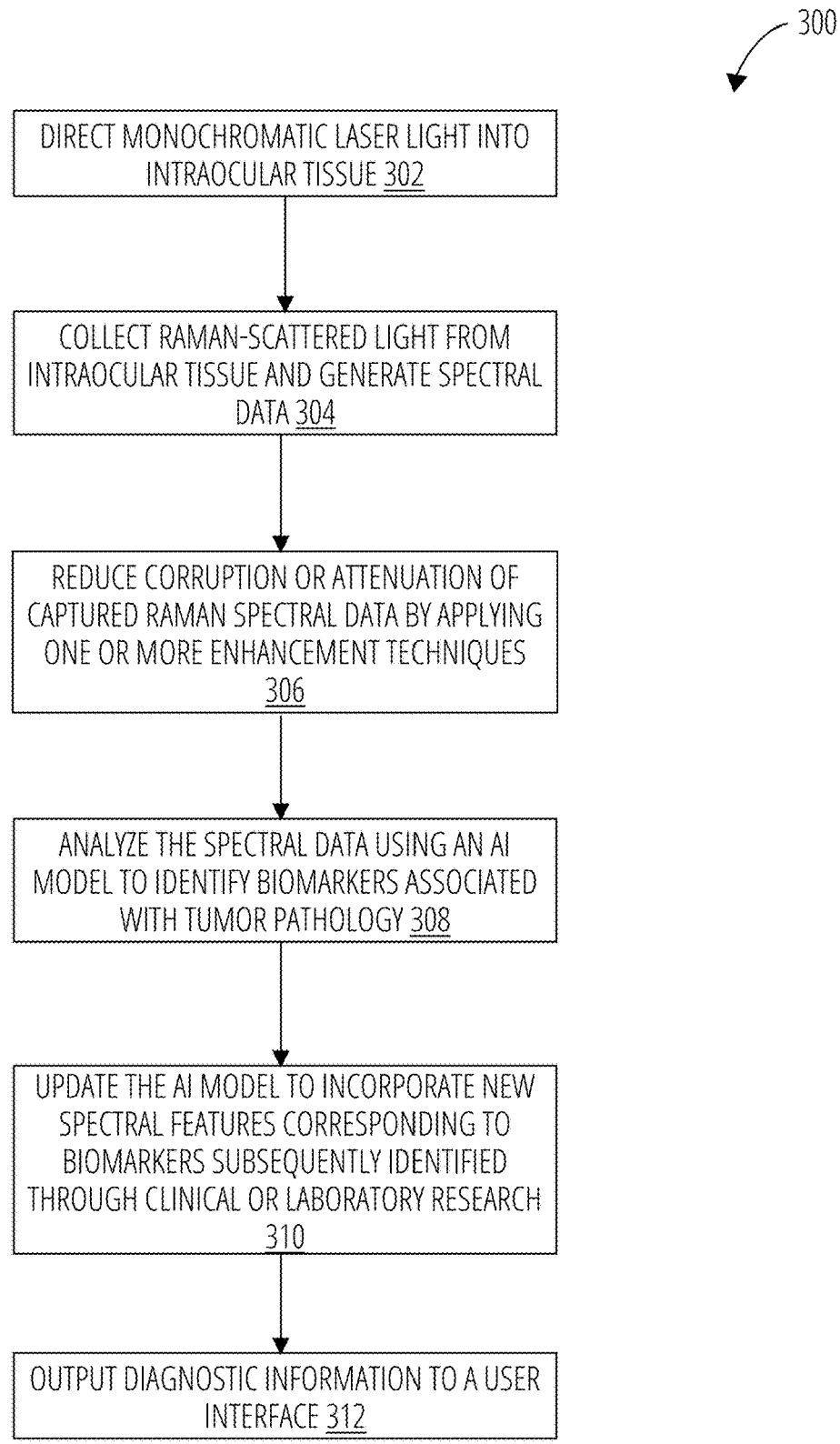
FIG. 3 illustrates a routine 300 for diagnosing intraocular tumors using AI-assisted Raman spectroscopy, in accordance with one embodiment.

The detection process, as seen in FIG. 3, may involve acquiring Raman spectra from the target tissue and preprocessing the spectral data using AI-based techniques. Convolutional neural networks (CNNs) are employed to enhance the feature extraction process by identifying unique spectral patterns corresponding to each biomarker. Noise reduction, baseline correction, and normalization are applied to improve the quality of the acquired spectra.

Once the patient is ready, the Raman excitation source, typically a monochromatic laser 106, is directed toward the ocular tissue of interest (block 302). This could be the retina, choroid, or other intraocular structures potentially harboring tumors 104 such as uveal melanoma or retinoblastoma.

The monochromatic light interacts with the molecules within the tissue, causing them to vibrate at distinct frequencies, thereby producing a scattered light spectrum. This spectrum, known as the Raman spectrum, is collected by a specialized detector 110 capable of capturing these weak signals. The detector (charge-coupled device 110) converts the spectral data into a digital format, making it ready for analysis (block 304).

Once the spectral data are collected, they undergo preprocessing to enhance signal clarity (block 306). This involves noise reduction techniques such as Savitzky-Golay filtering, wavelet transform denoising, and adaptive smoothing algorithms. Additionally, baseline correction is applied to eliminate spectral interferences from background noise or overlapping tissue signals, ensuring that only relevant biochemical information is retained. Normalization procedures are then employed to standardize the data, making it suitable for AI processing.

The spectral data may be fed into one or more processors 124 equipped with AI/ML interpretation models 134 designed to identify biomarkers associated with intraocular tumors 104 (block 308). Here, several AI/ML interpretation models 134 may come into play, each serving a unique purpose. For instance, Convolutional Neural Networks (CNNs) are used to extract intricate spectral features that may be indicative of tumor 104 presence. CNNs are preferred for analysis of intraocular tumors 104 because of their exceptional ability to learn hierarchical patterns from complex datasets. CNNs are trained using a large and diverse spectral dataset containing labeled examples of benign and malignant tissue.

Support Vector Machines (SVMs) may be employed for classifying spectral signatures to differentiate between healthy tissue, benign growths, and malignant tumors. Recurrent Neural Networks (RNNs) are utilized when analyzing spectral data over time, enabling the system to track changes and progression in biomarker patterns. Random Forests serve as a complementary approach, providing robust classification through ensemble learning by constructing multiple decision trees and aggregating their predictions.

To enhance accuracy and robustness, the AI/ML interpretation models 134 may incorporate transfer learning, where knowledge gained from previously analyzed datasets is applied to new or similar diagnostic tasks (block 310). This technique significantly improves diagnostic performance even when limited spectral data is available.

The AI/ML interpretation models 134 may be optimized using cross-validation techniques and hyperparameter tuning to achieve the highest possible accuracy. Feature extraction processes further enhance classification by identifying key spectral biomarkers associated with intraocular tumors 104, such as specific molecular vibrations indicating malignancy.

Once the AI/ML interpretation models 134 have processed the Raman spectra, the AI-enhanced Raman spectroscopy diagnostic system 112 generates diagnostic results through the deployment phase, which may include a probability score indicating the likelihood of tumor 104 presence, biomarker classification details, and suggested diagnostic actions. During this phase, the trained models are integrated with a diagnostic interface that provides real-time feedback on tumor presence and classification.

The interface could display the probability scores and classification results, enabling clinicians to make informed decisions rapidly (block 312). For example, if a spectrum matches known patterns associated with uveal melanoma, the AI-enhanced Raman spectroscopy diagnostic system 112 could alert the clinician or patient with a detailed actionable report. By rapidly classifying spectral data and providing immediate diagnostic insights, the AI-enhanced Raman spectroscopy diagnostic system 112 ensures that clinicians can detect and monitor intraocular tumors 104 with unprecedented accuracy and efficiency.

Additionally, if the AI/ML interpretation model 134 detects previously unknown spectral patterns, it flags these as potential new biomarkers. The AI-enhanced Raman spectroscopy diagnostic system 112 then may store this data for further analysis and refinement, thereby improving its ability to detect and classify novel biomarkers over time.

A combination of biomarkers can be a far more effective diagnostic factor when compared to a single biofactor. The analysis of multiple biomarkers, also known as biomarker panel analysis or multiplex biomarker detection, is a key component of AI-assisted Raman spectroscopy for improving the sensitivity, specificity, and overall accuracy in the diagnosis of intraocular tumors 104.

Furthermore, the AI-enhanced Raman spectroscopy diagnostic system 112 may be designed to continuously improve over time. New spectral data obtained from clinical usage are fed back into the AI/ML interpretation models 134, allowing for periodic retraining and refinement to enhance accuracy and generalization. The incorporation of adaptive learning mechanisms ensures that the AI-enhanced Raman spectroscopy diagnostic system 112 remains robust even as new types of intraocular tumors 104 are encountered. The ability of AI to adapt to evolving and new biomarkers is crucial to its accuracy and relevance.

In cases where continuous monitoring is desired, wearable devices such as smart glasses or contact lenses can be employed. These devices continuously collect Raman spectra from the eye 102, allowing the AI/ML interpretation model 134 to monitor eye tumor 104 progression or regression in real-time. The collected data is periodically transmitted through the network interface 126 to a cloud-based AI processor for aggregated learning and model improvement.

For remote diagnostics, the patient can utilize a smartphone-compatible Raman device, which interfaces directly with cloud-based AI systems. The cloud processor performs the spectral analysis and provides instant diagnostic feedback to the patient or clinician via a secure application interface.

makes the AI-enhanced Raman spectroscopy diagnostic system 112 especially powerful for detecting not only known biomarkers but also future-discovered biomarkers associated with intraocular tumors 104. Unsupervised learning techniques such as Principal Component Analysis (PCA) can be used to enhance biomarker discovery and spectral unmixing. Deep learning models, such as Transformer Networks and Deep Belief Networks (DBNs), have the potential of uncovering novel biomarkers related to malignant ocular tumors 104 that may be invisible to traditional statistical methods.

Unsupervised learning is particularly valuable in identifying novel biomarkers linked to tumor 104 aggressiveness. For example, mutations in the BAP1 gene are strongly associated with the BAP1 protein, a biomarker correlated with increased risk of metastasis in uveal melanoma. Capture of Raman spectral data related to such biomarkers can play an important role in establishing the diagnosis and informing the treatment plan for ocular melanoma. AI algorithms can analyze longitudinal spectral data to predict tumor 104 progression, aggressiveness, and the potential for metastasis.

Spectroscopy Signal Processing

Analyzing tumors 104 of the posterior uvea (choroid, ciliary body) and retina, attenuation of Raman signals can be a significant challenge due to light scattering, absorption, and interference from biological tissues. A plurality of techniques is available to overcome or minimize corruption or attenuation of a Raman signal is summarized in Table 5, shown below.

TABLE 5

Techniques to Minimize Altered Signal with Intraocular Tumors

| TECHNIQUE | DESCRIPTION |
|---|---|
| Near-Infrared (NIR) Excitation | Using NIR laser sources (785 nm, 830 nm, or 1064 nm) helps reduce interference from autofluorsence and absorption by melanin, which is highly concentrated in the uvea and retina. |
| Spatially Offset Raman Spectroscopy Enhanced Signal Collection Optics | Utilizing fiber optic probes, gradient index (GRIN) lenses, or endoscopic systems for efficient light delivery and collection. Adapting the collection optics to maximize the capture of Raman-scattered photons from deeper tissues. |
| Machine Learning & Signal Processing | Implementing AI models capable of differentiating weak Raman signals from background noise and autofluorescence. Noise reduction techniques such as Wavelet Transform Denoising, Principal Component Analysis (PCA), and Savitzky-Golay Filtering can enhance signal clarity. |
| Time-Gated Raman Spectroscopy | Utilizing ultrashort pulsed lasers and time-gated detectors to distinguish Raman signals from fluorescence and other background noise. Particularly useful for high-contrast imaging of deep-seated tissues. |

Furthermore, hybrid imaging systems that combine Raman spectroscopy with Optical Coherence Tomography 136 may provide additional structural information about the tissue. This complementary data helps enhance diagnostic precision by correlating spectral biomarker profiles with anatomical features of the tumor 104.

The final diagnostic report may be presented to the clinician or patient through an intuitive user interface 132 (block 312). The report could highlight the detected biomarkers, their classifications, predictive scores for malignancy, and recommended follow-up actions. It may also suggest specific therapeutic interventions if the spectral data indicates a particular treatment response.

As the AI-enhanced Raman spectroscopy diagnostic system 112 continuously learns from newly acquired data, its diagnostic accuracy improves over time. This adaptability Spectroscopy Techniques to Improve Signal Confocal Raman Spectroscopy (CRS)

Confocal Raman Spectroscopy (CRS) offers a significant advancement in the precision and reliability of Raman-based imaging, particularly when applied to the detection and analysis of uveal and retinal tumors 104. This technique integrates a confocal optical configuration with a pinhole aperture that restricts the detection of light to a sharply defined focal plane. By rejecting scattered and out-of-focus photons from surrounding tissues, CRS effectively isolates signals originating only from the region of interest—greatly enhancing the clarity and resolution of the collected spectral data.

One of the most notable advantages of CRS is its ability to dramatically improve the signal-to-noise ratio (SNR). In biological tissues such as the choroid or retina, light scattering can introduce substantial background interference, particularly when attempting to detect weak Raman signals from deep-seated or small lesions. CRS overcomes this challenge by filtering out optical noise and collecting only the Raman-scattered photons that are sharply in focus. This ability to capture clean, high-quality signals is essential In summary, Confocal Raman Spectroscopy is a cornerstone technology for improving the spectral resolution, clarity, and diagnostic value of Raman-based imaging in ophthalmic oncology. Its integration into AI-enhanced detection platforms positions it as a transformative tool for non-invasive, high-precision analysis of intraocular tumors 104.

TABLE 6

The Benefits of Confocal Raman Spectroscopy

| | | |
|---|---|---|
| Improved Signal Collection | CRS use of a pinhole enhances signal-to-noise ratio | Eliminates out-of-focus light to enhance clarity of the detected signal |
| Enhanced Depth Perception | Selective acquisition of Raman signals from specific tissue layers | Improves detection of biochemical changes associated with uveal and retinal tumors |
| Reduced Background Noise | Eliminates unfocused photons | Reduces interference from surrounding tissues to provide clearer signals. |
| High Spatial Resolution | Provides detailed mapping of molecular compositions | Identifies tumor margins and differentiates malignant from benign tissues |
| Compatibility with Other Techniques | Can be integrated with NIT excitation, SORS, and Optical Clearing Agents | Better signal detection and analysis of deep tissues | when evaluating early-stage tumors 104 or subtle molecular changes that may otherwise be obscured.

In addition to SNR improvements, CRS provides enhanced spatial resolution. This is particularly important when localizing and analyzing tumor 104 margins, especially in small or early-detected intraocular tumors 104 where lesion boundaries may be indistinct. The precise optical confinement of both excitation and detection paths allows for highly localized spectral analysis, reducing ambiguity in tumor 104 identification and improving the diagnostic accuracy of tissue characterization.

CRS also enables depth profiling—a powerful feature that allows clinicians and researchers to obtain Raman spectra from multiple layers within the uveal or retinal tissue. By adjusting the focal plane incrementally, CRS can collect sequential spectral data at varying depths, effectively building a molecular map of the tumor's vertical structure. This capability is crucial for assessing tumor 104 invasion into deeper tissue layers and for tracking structural and biochemical changes over time.

Another important benefit of CRS is the reduction of background noise originating from adjacent, non-targeted tissues. In ocular tumors 104, especially those located near pigment-rich or structurally complex regions, unwanted light scatter from surrounding healthy tissue can distort spectral interpretation. The confocal setup minimizes this issue, resulting in purer, more reliable data that can be analyzed with greater confidence—particularly when paired with AI-assisted classification models.

Finally, CRS enhances the specificity of biochemical analysis. Because it isolates a narrowly defined sample volume, the system can more effectively target molecules of interest within the tumor 104. This molecular selectivity allows for improved detection of tumor-specific biomarkers, which is vital for accurate classification, prognosis, and treatment planning. When used in conjunction with AI-driven analytics, CRS-generated spectral data enables robust training of models for precise diagnosis, helping to distinguish between benign, pre-malignant, and malignant lesions with high fidelity.

Complementary at Techniques to Improve Raman Spectroscopy Signal Quality

The integration of artificial intelligence into Raman spectroscopy offers a powerful avenue for enhancing signal quality and improving diagnostic accuracy, particularly in the complex environment of intraocular tumor 104 analysis. One of the foundational applications of AI in this context lies in the preprocessing of spectral data. Raw Raman spectra acquired from biological tissues often contain significant noise, fluorescence background, and baseline drift especially in in-vivo settings where signal attenuation and tissue variability are prevalent. AI-based preprocessing methods are designed to address these challenges through the application of advanced techniques such as noise filtering, baseline correction, and spectral normalization.

Among the most effective noise reduction strategies are Wavelet Transform Denoising, Principal Component Analysis (PCA), and Savitzky-Golay Filtering. These methods serve to suppress irrelevant variations in the spectra while preserving meaningful vibrational information. When properly configured, they can isolate weak Raman signals that are otherwise buried in background noise, thereby improving the overall clarity and interpretability of the spectral data. These improvements are particularly beneficial for spectral data obtained from the posterior uveal tract or retina, where biological noise and light scattering present frequent obstacles to precise measurement.

SVMs complement CNNs by providing high-performance binary and multi-class classification, ensuring robust differentiation between normal tissue, benign lesions, and malignancies. Random Forests, with their ensemble approach to decision-making, enhance classification reliability, especially in datasets with high variability.

A key challenge in in-vivo Raman spectroscopy is the presence of overlapping signals and optical interference from the biological environment. These issues are further compounded by the presence of substances like silicone oil, often introduced during vitreoretinal procedures. Silicone oil has its own strong Raman spectral peaks, which can overlap with or mask the weaker signals emanating from underlying tumor tissue. Moreover, silicone oil can act as an optical barrier, attenuating signal strength or producing fluorescence that competes with the true Raman signature. The degree of interference depends on the silicone's optical density, chemical composition, and spatial distribution within the vitreous cavity.

AI plays a crucial role in overcoming these signal degradation challenges. Learning-adjusted algorithms can be trained using extensive spectral datasets that include intraocular tissue types and known interferents like silicone oil. This allows the AI system to distinguish between spectral patterns associated with normal tissues, tumor biomarkers, and artificial substances, even in the presence of strong overlapping signals. Unsupervised learning techniques, such as clustering and dimensionality reduction, further enhance this capability by isolating latent spectral features and identifying anomalies or new biomarker signatures within complex data environments.

In cases where signal attenuation limits the detection of tumor-related features, transfer learning provides a valuable solution. Pre-trained models from related tissue types or diagnostic domains can be adapted to the intraocular tumor 104 context, thereby accelerating training and improving generalization on small or heterogeneous datasets. This approach is particularly effective in clinical scenarios where Raman spectra are limited in number or quality due to anatomical constraints or patient movement.

Altogether, these complementary AI methodologies not only strengthen the signal integrity of Raman spectroscopy but also transform it into a reliable and scalable tool for intraocular tumor 104 diagnosis. By automating preprocessing, feature extraction, classification, and interference suppression, AI facilitates a diagnostic pipeline that is both sensitive and resilient to the inherent variability of biological systems. This synergy between Raman spectroscopy and artificial intelligence is central to the development of non-invasive, real-time ocular oncology tools with exceptional clinical potential.

Preprocessing techniques that include noise reduction, baseline correction, autofluorescence, and normalization can be configured to improve accuracy of spectral data. Noise reduction techniques such as Wavelet Transform Denoising, Principal Component Analysis (PCA), and Savitzky-Golay Filtering can enhance signal clarity. High-resolution spectra and large, comprehensive datasets that are well-prepared improve AI training and validation.

Challenges associated with in-vivo detection, such as spectral overlap and biological interference, are addressed through sophisticated preprocessing techniques and model training approaches. Learning-adjusted AI algorithms can be implemented to overcome challenges related to the complexity of Raman spectra, particularly when dealing with weak signals and high noise levels. Weak signals can be caused by attenuation of laser radiation as it passes through the cornea, aqueous humour, lens, and vitreous.

The presence of silicone oil in the vitreous cavity can produce strong Raman scattering, resulting in characteristic spectral peaks that can overlap with signals from an intraocular tumor 104. The spectral peaks from silicone can mask weak Raman signals from the underlying tumor 104 reducing diagnostic accuracy. Silicone oil also serves as an optical barrier that reduces the intensity of Raman signals reaching the detector or causes fluorescence that also interferes with the Raman signal. Attenuation and corruption of the signal is also dependent on the density and composition of the silicone oil.

The AI/ML interpretation models 134 can be optimized to improve diagnostic accuracy by learning from extensive datasets of Raman spectra obtained from various intraocular tissue types and intraocular substances, including silicone oil. Unsupervised Learning also assists in mitigating silicone oil interference within the vitreous cavity by improving signal extraction and enhancing diagnostic precision.

AI-based preprocessing methods are employed to improve signal quality. Techniques such as noise filtering, baseline correction, and spectral normalization are applied using deep learning frameworks to ensure data consistency and reliability. Furthermore, transfer learning is utilized to enhance model robustness and generalization when applied to new datasets. LASER POWER SPECIFICATIONS AND SAFETY CONSIDERATIONS In one embodiment, the AI-enhanced Raman spectroscopy diagnostic system 112 is configured to deliver excitation energy through a near-infrared laser 106 source, typically operating at wavelengths between 785 nm and 830 nm, selected to reduce background fluorescence and maximize Raman signal strength in ocular tissues. The optical output power at the distal tip of the fiber optic interface is constrained to the range of 1 to 5 milliwatts (mW), in some embodiments, depending on tissue type, tumor 104 depth, and system configuration.

The excitation beam may be delivered using a single-mode or multimode fiber, or a multi-fiber assembly, which can include dedicated fibers for illumination and collection. The beam could be focused onto the tissue with a spot size between 50 m and 200 m, enabling localized probing of intraocular structures with minimal thermal or photochemical risk.

Power levels may be selected to remain within the Maximum Permissible Exposure (MPE) limits as defined by ANSI Z136.1 for ophthalmic applications. The system may incorporate real-time laser power monitoring, automated exposure control, and interlock mechanisms to ensure compliance with laser safety protocols. Exposure durations may be limited to less than 10 seconds per acquisition, with most spectral scans acquired in rapid sequences (e.g., 10 scans at 500 ms each) to facilitate averaging and signal enhancement without exceeding MPE thresholds.

In configurations utilizing signal enhancement techniques such as Surface-Enhanced Raman Scattering (SERS) or confocal Raman geometry, the power may be further reduced (e.g., to <2 mW) due to the increased signal-to-noise ratio enabled by these methods. These enhancements allow for high-fidelity detection of biochemical signatures even in low-light or deep-tissue environments.

The system's laser safety architecture may ensure that exposure to sensitive ocular components—particularly the retina—is minimized, and all operational parameters may be dynamically adjusted based on anatomical location, tumor morphology, and desired spectral resolution.
Raman-Based Molecular Differentiation of Ocular Neoplasms and Amyloid In addition to neoplastic conditions such as uveal melanoma, the AI-enhanced Raman spectroscopy diagnostic system 112 is capable of identifying non-neoplastic molecular signatures such as amyloid fibrils, which might otherwise be mistaken for intraocular tumors 104.

The disclosed AI-enhanced Raman spectroscopy diagnostic system 112 provides a non-invasive, real-time diagnostic platform for the molecular characterization of intraocular and periocular abnormalities. While the AI-enhanced Raman spectroscopy diagnostic system 112 is configured to detect and classify neoplastic lesions such as uveal melanomas based on Raman spectral features of melanin, nucleic acids, and lipid profiles, it may also be designed to identify non-neoplastic conditions that may clinically mimic tumors 104.

Although typically arising in different compartments, amyloid deposits—especially in the vitreous or near peripapillary regions—may visually or radiographically mimic intraocular tumors 104 and lead to misclassification without molecular classification. For example, the AI-enhanced Raman spectroscopy diagnostic system 112 can detect β-sheet-rich amyloid fibrils in the vitreous or ocular tissues, which might otherwise be mistaken for intraocular tumors 104. Utilizing the same laser 106, optical path, beam splitter 108, charge-coupled device 110, spectrometer 116, and AI/ML interpretation model 134, the AI-enhanced Raman spectroscopy diagnostic system 112 is applicable to a broad range of diagnostic scenarios, including detection of amyloid in the vitreous and other ocular structures. This capability reduces the need for invasive procedures and enhances diagnostic accuracy.

Amyloid is detectable by Raman spectroscopy in multiple ocular locations, including the conjunctiva, cornea, anterior chamber, iris, ciliary body, choroid, and lens. In many clinical scenarios, amyloid present in the vitreous, uveal tract, and anterior chamber is associated with systemic amyloidosis.

In some embodiments, the disclosed AI-enhanced Raman spectroscopy diagnostic system 112 is configured to detect the presence of amyloid fibrils in ocular tissues. The Raman spectrometer captures vibrational spectra from intraocular regions including the vitreous and uveal tract, generating a digital spectral profile. Although retinal amyloid deposition is rare as supported by sparse histopathological evidence in systemic amyloidosis, the 112 may capture Raman signals from periretinal structures or overlying vitreous material. The spectral signature of amyloid can be distinguished from that of ocular tumors 104.

alignment, and spectral filtering may be applied to reduce autofluorescence or enhance weak signals. The CNN classifier 128 can be continuously refined with additional labeled spectral data, enabling adaptive learning and ongoing expansion of the diagnostic repertoire. Thus the Raman spectrum database 130 may be periodically updated to incorporate new biomarker profiles.

The CNN classifier 128—based on a convolutional neural network (CNN) or hybrid AI model—is trained on spectra from normal ocular tissues, neoplastic lesions, and amyloid-positive samples. It compares each scan against a reference database to estimate the presence and severity of amyloid involvement, including localized vitreous amyloidosis, intraocular amyloid masses, or systemic amyloidosis with ocular manifestation. The AI/ML interpretation model 134 is capable of segmenting and analyzing distinct molecular signatures, such as melanin-rich spectra consistent with melanoma, or β-sheet patterns consistent with amyloid. Rather than returning a binary result, the system outputs probability scores for multiple diagnostic possibilities, delivering a composite diagnosis that reflects the most likely spectral interpretation.

The user interface 132 displays these results in a clear, region-specific manner. For example, if the iris or vitreous is scanned, the AI-enhanced Raman spectroscopy diagnostic system 112 provides diagnostic results relevant to that tissue. In cases involving overlapping features, the AI-enhanced Raman spectroscopy diagnostic system 112 presents simultaneous differential diagnoses, allowing clinicians to distinguish between tumor 104 and amyloid with greater confidence.

Although uveal melanoma and vitreous amyloid typically arise in distinct anatomical regions of the eye 102, there are clinical scenarios in which these entities may appear similar and lead to diagnostic uncertainty. Vitreous amyloid can present as dense or nodular aggregates that mimic intraocular tumors 104 on imaging or during ophthalmoscopic

TABLE 7

Key Features of Amyloid Raman Spectral Data.

| | |
|---|---|
| Amide I Band Shift: | Amyloid fibrils typically show a strong Amide I band around 1665-1675 $cm^{-1}$, associated with β-sheet structures, which are characteristic of amyloid aggregates. This is distinct from α-helical structures, which show Amide I peaks around 1650 $cm^{-1}$. |
| Amide III Region: | Additional β-sheet signatures appear in the Amide III region (~1230-1300 $cm^{-1}$). |
| Distinct Side Chain Vibrations: | Specific peaks related to phenylalanine (~1003 $cm^{-1}$), tyrosine (~830 and 850 $cm^{-1}$), and tryptophan (~760 $cm^{-1}$) can reflect changes in aromatic environments due to amyloid folding. |
| Conformational Sensitivity: | Raman spectroscopy is sensitive to protein secondary structure, making it ideal for distinguishing misfolded amyloid fibrils from their native, soluble protein forms. |
| Non-invasive Detection Potential: | Especially when enhanced with Surface-Enhanced Raman Spectroscopy (SERS) or AI-based classifiers, Raman can detect amyloid at low concentrations in tissue, cerebrospinal fluid, or even tears and vitreous humor. |

The AI/ML interpretation model 134 analyzes Raman spectra to identify molecular features indicative of amyloid, including:

A strong Amide I band centered around 1665-1675 $cm^{-1}$

A prominent Amide III band in the 1230-1300 $cm^{-1}$ range

Peaks related to aromatic amino acids, including phenylalanine (~1003 $cm^{-1}$) and tyrosine (~830 and 850 $cm^{-1}$)

The system's optical beam can be directed or focused to target specific ocular regions via manual or automated focusing or beam steering. Video guidance assists in precise examination, particularly when located adjacent to the retina or optic nerve. In other cases, shadowing or hazy visualization due to amyloid obscuration may raise concern for an underlying uveal mass. Conversely, uveal melanomas can sometimes shed material into the vitreous, further complicating interpretation. Both conditions may present with similar symptoms such as floaters or visual disturbance, and both may trigger referrals for invasive interventions if not accurately distinguished. However, the systemic implications of each are substantially different: uveal melanoma is a primary intraocular malignancy with metastatic potential, whereas vitreous amyloid may be a manifestation of systemic amyloidosis requiring systemic evaluation and management. The disclosed AI-assisted Raman spectroscopy system enhances diagnostic confidence by enabling non-invasive molecular differentiation between neoplastic lesions and non-neoplastic deposits such as amyloid. By analyzing vibrational signatures of melanin, nucleic acids, and β-sheet protein structures, the AI-enhanced Raman spectroscopy diagnostic system 112 may support a composite diagnostic output that reduces the likelihood of misdiagnosis and guides clinically appropriate follow-up and treatment.

Detailed Clinical Application of AI-Assisted Raman Spectroscopy

Raman Spectroscopy and AI-Based Classification of Uveal Melanoma Subtypes

Comparison Between Raman Spectroscopy and Tissue Biopsy for Intraocular Melanoma While tissue biopsy remains the definitive diagnostic modality for many solid tumors, including melanomas, its use in intraocular settings, particularly for uveal melanomas, is often limited by anatomical and clinical constraints. Biopsy provides the advantage of direct cellular and histopathologic analysis, enabling detailed assessment of

TABLE 8

Distinguishing Uveal Melanoma from Vitreous Amyloid.

| Feature | Uveal Melanoma Detection | Vitreous Amyloid Detection |
| --- | --- | --- |
| Biomarker Focus | Melanin, lipids, nucleic acids | β-sheet proteins, fibrillar structures |
| Spectral Signature | Broad peaks (e.g., ~1580 $cm^{-1}$ for melanin) | Narrow Amide I & III peaks (~1665, ~1235 $cm^{-1}$) |
| Tissue Location | Uveal tract (choroid, iris, ciliary body) | Vitreous body |
| AI Function | Tumor classification | Amyloidosis classification |
| Shared System Tools | Laser, CCD, spectrometer, AI unit | Laser, CCD, spectrometer, AI unit |

Clinical Scenario—Composite Diagnosis Prevents Unnecessary Surgery

A 62-year-old patient presents with a suspicious mass in the peripheral iris, detected during a routine slit-lamp examination. The lesion appears slightly pigmented and irregular in shape, raising clinical concern for a possible iris melanoma.

Under standard practice, the next step would typically involve an Ultrasound biomicroscopy or anterior segment Optical Coherence Tomography 136 for size characterization, followed by a referral to an ocular oncologist, and potential surgical biopsy or excision, which carries risk of bleeding, intraocular pressure elevation, and permanent structural damage.

However, the clinic is equipped with the AI-enhanced Raman spectroscopy diagnostic system 112. So instead the lesion is scanned non-invasively with the Raman probe via slit lamp. Within seconds, the AI-enhanced Raman spectroscopy diagnostic system 112 analyzes the spectral signature and finds no dominant melanin peaks and strong β-sheet-associated Amide I and III peaks. The AI/ML interpretation model 134 assigns a high probability to amyloid deposition, not melanoma. The result is a Composite diagnosis displayed as a low likelihood of melanoma (7%) and a high likelihood of amyloid-related lesion (92%). The clinician is prompted to consider localized ocular amyloidosis, which is benign and often managed conservatively. A biopsy is avoided, and the patient is referred for systemic evaluation for amyloidosis.

nuclear morphology, mitotic activity, and chromosomal aberrations. It supports immunohistochemistry, cytogenetics, and gene expression profiling (e.g., BAP1 status, monosomy 3, GNAQ/GNA11 mutations). However, intraocular biopsy carries substantial risk, including intraocular hemorrhage, retinal detachment, extraocular tumor seeding, and permanent visual impairment.

Raman spectroscopy, by contrast, offers a non-invasive, real-time alternative that captures molecular vibrational spectra from intact tissue. While it does not provide cellular-level histology, Raman spectroscopy is capable of detecting subtle biochemical changes, such as variations in melanin structure, protein folding (e.g., β-sheets), lipid oxidation, and nucleic acid signatures, that correlate with tumor behavior. These features are especially relevant in melanomas, where spectral differences may reflect underlying genetic mutations, necrotic activity, or inflammatory response.

The use of AI-enhanced Raman spectroscopy diagnostic systems 112 further extends the value of this modality by enabling probabilistic classification of tumor subtypes, continuous learning from biopsy-confirmed cases, and composite risk stratification. This is particularly important for small or borderline pigmented lesions, where biopsy is not feasible, and where the decision to monitor, treat, or biopsy further depends on biochemical characterization.

Thus, Raman spectroscopy does not replace tissue biopsy in terms of absolute diagnostic accuracy, but it offers a compelling adjunct or alternative in intraocular oncology. It provides a safe, repeatable, and molecularly rich data stream

TABLE 9

Illustrative Summary of Benefits.

| Feature | Clinical Impact |
| --- | --- |
| Non-invasive molecular analysis | Avoids biopsy or surgical excision |
| AI-enhanced spectral profiling | Differentiates tumor from amyloid in real time |
| Composite diagnosis | Guides tailored treatment decisions |
| Region-specific targeting | Ensures lesion-specific interpretation |
| Systemic insight from ocular scan | Triggers early detection of systemic amyloidosis | that can guide biopsy decisions, reduce unnecessary interventions, and support personalized patient management in uveal melanoma care.

Choroidal melanomas, like other uveal melanomas including iris and ciliary body tumors, do not exhibit uniform Raman spectral profiles. These tumors vary considerably in their biochemical composition depending on melanin concentration, lipid content, protein conformation, and the presence of necrosis or hemorrhage. For example, heavily pigmented melanomas produce strong melanin-associated peaks around 1580 $cm^{-1}$, while amelanotic variants may yield spectra dominated by proteinaceous or lipid-associated bands. Additionally, tumor subtypes associated with specific genetic mutations, such as GNAQ, GNA11, SF3B1, or BAP1 deletions, may exhibit subtle but distinguishable molecular signatures in their Raman output.

The tumor microenvironment further influences spectral variability. Factors such as inflammation, extracellular matrix remodeling, vascularization, and interstitial fluid content can contribute overlapping or competing signals, complicating traditional pattern-based interpretation. While Raman spectral differences among uveal melanoma subtypes may initially appear subtle or nonspecific, the incorporation of machine learning enables pattern recognition beyond human perceptual limits. As the Raman spectrum database 130 expands with genetically and histopathologically confirmed cases, the AI/ML interpretation model 134 continuously improves its classification accuracy, ultimately transforming Raman spectroscopy into a powerful tool for nuanced molecular stratification.

The identification of melanoma subtypes is clinically significant because each subtype may carry different prognostic implications and therapeutic pathways. For example, BAP1-mutated melanomas are often associated with a higher risk of metastasis and poorer outcomes, necessitating closer systemic surveillance and potentially more aggressive treatment. Conversely, tumors lacking high-risk mutations

TABLE 10

Cytogenetic and Molecular Subtypes of Choroidal Melanoma with Raman Features

| Subtype | Characteristics | Raman Spectral Data (Indicative Features) |
| --- | --- | --- |
| Monosomy 3 | Loss of one copy of chromosome 3; often with BAP1 mutations | Elevated nucleic acid and protein band intensities; possible signs of necrosis |
| Disomy 3 with 8q gain | Retains both chromosome 3 copies; gain of chromosome 8q | Moderate protein-lipid balance with occasional stress-induced signals |
| Disomy 3 without 8q gain | Genetically stable | Low spectral complexity; dominance of native protein secondary structures |
| BAP1-mutated | Tumor suppressor gene loss; often overlaps with Monosomy 3 | High amide I/III shifts; disordered protein signatures; increased oxidative stress markers |
| SF3B1-mutated | Splicing factor mutation; intermediate risk | Pronounced Amide III variability; increased metabolic intermediates |
| EIF1AX-mutated | Translation initiation gene mutation; good prognosis | Stable spectral signatures with clear aromatic amino acid peaks (Phe, Tyr) |

TABLE 11

Iris Melanomas Subtypes and Raman Features

| Subtype | Characteristics | Raman Spectral Data (Indicative Features) |
| --- | --- | --- |
| Low-pigment iris nevus | Slow-growing; often stable over years | Weak melanin peaks; dominant protein and aqueous background signals |
| Pigmented iris melanoma | More aggressive; often visible due to color change | Strong melanin-associated peaks (~1580 $cm^{-1}$); broad Amide I and III features |
| Epithelioid cell type | Rare in iris; more aggressive when present | Increased protein aggregation and amide band shifts indicating atypical tissue metabolism |

TABLE 12

Ciliary Body Melanoma Subtypes and Raman Features

| Subtype | Characteristics | Raman Spectral Data (Indicative Features) |
| --- | --- | --- |
| Circumferential tumors | Spread diffusely around ciliary body; often diagnosed late | Diffuse signal with overlapping melanin, collagen, and vascular components |
| Pigmented ciliary melanoma | Discovered during exams or angle closure symptoms | Strong melanin peaks; lipid variability depending on necrotic or vascular content |
| Non-pigmented melanoma | Less common; difficult to detect clinically | Low melanin signal; elevated protein and oxidative stress markers | may be eligible for more conservative monitoring. Molecular subclassification may also inform enrollment in clinical trials or targeted therapies.

Table 13: Diagnostic Decision Tree for AI-Assisted Raman Classification
1. Input: Acquire Raman spectra from target intraocular lesion.
2. Preprocessing: Normalize, filter, and extract key spectral features.
3. Primary Classification Node: Is the lesion spectral profile consistent with known neoplastic vs. non-neoplastic features?
If neoplastic→go to Step 4.
If non-neoplastic→go to Step 5.
4. Neoplastic Subtyping:
Classify as melanoma, metastasis, lymphoma, or pediatric tumor subtype.
Output diagnostic probabilities and suggested systemic correlations.
5. Non-neoplastic Differentiation:
Classify as granulomatous, infectious, or inflammatory pseudotumor.
Output differential diagnosis and recommend relevant systemic testing.
6. Composite Diagnosis:
Display results with confidence scores and visual indicator for biopsy or referral.

Thus, the AI-enhanced Raman spectroscopy diagnostic system 112 becomes not merely a detection tool, but a sophisticated pattern recognition platform capable of distinguishing among diverse melanoma presentations, supporting more precise molecular classification of tumors and facilitating informed clinical decision-making.

AI-Based Raman Spectroscopy for Subtyping Non-Melanoma Intraocular Tumors Including Metastatic Breast Cancer While uveal melanomas represent the most studied form of primary intraocular malignancy, a diverse array of non-melanoma intraocular tumor 104 exists, each with distinct molecular and clinical characteristics. These include metastatic lesions (most commonly from breast and lung), retinoblastomas, medulloepitheliomas, uveal lymphomas, and benign or borderline lesions such as hemangiomas or leiomyomas. Accurate differentiation of these subtypes is clinically essential, as it directly influences systemic evaluation, treatment planning, and prognostication.

Metastatic tumor 104 to the choroid, particularly from breast and lung carcinomas, are among the most common non-primary intraocular malignancies. They exhibit Raman spectral signatures that vary with their receptor subtype, degree of necrosis, and stromal interaction. For example, triple-negative breast cancer metastases may display spectral patterns marked by oxidative stress bands, disrupted protein conformation, and nucleic acid enrichment, whereas luminal A metastases may present more stable and less metabolically intense spectra.

Other tumor 104 types such as uveal lymphomas are typically characterized by dense lymphocytic infiltration and relatively low lipid content, resulting in distinctive Raman profiles dominated by nucleic acid and protein peaks. Retinoblastomas, a childhood malignancy of the retina, exhibit high mitotic activity and calcification, with Raman spectra often reflecting elevated nucleic acid content and sharp mineral-associated bands. Even benign lesions such as circumscribed choroidal hemangiomas produce unique Raman signatures due to high vascularity and extracellular matrix content.

By training the AI/ML interpretation model 134 on histopathologically validated spectra from these diverse intraocular tumor 104 types, the AI-enhanced Raman spectroscopy diagnostic system 112 is capable of assigning subtype-specific probabilities based on subtle but consistent molecular patterns. This capability facilitates improved diagnostic precision, especially in cases where imaging is inconclusive or biopsy is contraindicated. Additionally, Raman-based subtyping enables the AI-enhanced Raman spectroscopy diagnostic system 112 to distinguish neoplastic from inflammatory or reactive lesions, thereby reducing the likelihood of overtreatment.

The AI-enhanced Raman spectroscopy diagnostic system 112 is thus broadly applicable to the classification and subtyping of intraocular tumors 104, supporting differential diagnosis across primary melanocytic lesions, metastatic neoplasms, lymphoproliferative disorders, pediatric tumors, and benign mimickers.

Inflammatory and Infectious Mimickers in AI-Based Raman Spectroscopy

In addition to intraocular tumors 104, a wide spectrum of inflammatory and infectious conditions may clinically mimic malignancies in the eye 102. These include granulomatous uveitis, sarcoidosis, syphilitic chorioretinitis, toxoplasmosis, tuberculosis-related ocular lesions, and idio-

TABLE 14

Metastatic Breast Cancer Subtypes and Corresponding Ocular Raman Spectral Profiles

| Subtype | Receptor Status | Ocular Presentation | Raman Spectral Data (Indicative Features) |
|---|---|---|---|
| Luminal A | ER+/PR+, HER2− | Solitary, slow-growing choroidal lesion | Stable Amide I/III profiles; moderate lipid peaks; low oxidative stress indicators |
| Luminal B | ER+/PR+/−, HER2+ | Aggressive choroidal or multifocal deposits | Enhanced protein folding variation; HER2-related membrane signatures; elevated metabolic markers |
| HER2-enriched | ER−/PR−, HER2+ | Often multifocal, rapid progression | Sharp lipid-related peaks; HER2-associated surface protein resonance; variable Amide I shifts |
| Triple-negative (TNBC) | ER−/PR−, HER2− | Necrotic, pigmented, inflammatory lesions | Intense oxidative stress bands (~1740 cm$^{-1}$), elevated nucleic acid peaks, disrupted protein spectra | pathic inflammatory pseudotumors. These entities may present with mass-like or infiltrative features, leading to diagnostic confusion with melanomas, metastases, or lymphomas.

TABLE 15

Representative Raman Spectral Features for Inflammation and Infectious Mimickers

| Condition | Clinical Mimic | Raman Spectral Data (Indicative Features) |
| --- | --- | --- |
| Granulomatous uveitis (e.g., TB) | Melanoma or lymphoma | Broad Amide I/III peaks; elevated lipid peroxidation bands; protein denaturation signatures |
| Sarcoidosis | Choroidal metastasis or pseudotumor | Increased collagen-associated peaks; oxidative stress signals; variable amide ratios |
| Syphilitic chorioretinitis | Melanoma or inflammatory mass | Nucleic acid enrichment; protein breakdown products; disrupted membrane lipid profiles |
| Toxoplasmosis | Lymphoma or retinal tumor | Strong nucleic acid signatures; high oxidative stress; protein fragmentation indicators |
| Inflammatory pseudotumor | Intraocular neoplasm | Mixed inflammatory signatures; non-specific protein and lipid stress patterns |

Such inflammatory and infectious lesions often exhibit distinct Raman spectral characteristics, including increased protein denaturation, altered lipid profiles, and elevated oxidative stress markers. For example, granulomatous inflammation may produce broad amide band shifts and enhanced signals from lipid peroxidation products, while infectious lesions often yield nucleic acid-rich spectra corresponding to cellular debris and pathogen-associated material.

The disclosed AI-enhanced Raman spectroscopy diagnostic system 112 incorporates these non-neoplastic conditions within its diagnostic framework. By training on labeled spectra from biopsy-confirmed inflammatory and infectious ocular lesions, the AI/ML interpretation model 134 becomes capable of distinguishing neoplastic from reactive or infectious processes, thereby reducing the risk of unnecessary surgery or systemic oncologic workup. This expanded diagnostic capacity increases clinical confidence, especially in immunocompromised patients or when systemic disease is suspected.

By including inflammatory and infectious mimickers, the AI-enhanced Raman spectroscopy diagnostic system 112 provides a truly comprehensive molecular diagnostic tool for the evaluation of intraocular abnormalities.

FIG. 1 depicts a representative system architecture of the AI-enhanced Raman spectroscopy diagnostic system 112. In this figure, a laser 106, such as a monochromatic excitation laser, is directed into the eye 102 through the cornea and lens, focusing light onto the posterior segment, specifically targeting a tumor 104, such as a uveal melanoma located in the choroid layer. The interaction between the laser 106 and intraocular tissue generates Raman-scattered light, which returns along the same optical path. A beam splitter 108 is positioned to intercept the backscattered light and redirect the Raman-scattered photons into a charge-coupled device 110 while allowing the laser to pass into the eye 102. The spectrometer 116, which receives data from the charge-coupled device 110, receives and processes the scattered light into digital spectral data. This data is then transmitted to computer 118, where spectral features are analyzed using AI/ML interpretation models 134. Diagnostic insights, including biomarker identification and classification of tumor risk, are output through a user interface 132 for clinical interpretation. FIG. 1 also highlights the seamless flow of optical and digital signals from excitation to diagnosis, demonstrating how signal integrity and clinical feedback are preserved through each stage of the AI-enhanced Raman spectroscopy diagnostic system 112.

In the process shown in FIG. 1, the laser 106 is directed into the eye 102 through a shared optical system that includes video transmission capability. Raman-scattered light reflected from the intraocular tumor 104 returns along the same optical path. The returning light is diverted by a beam splitter 108 toward a charge-coupled device 110, which converts the scattered light into raw spectral data. A Raman spectrometer 116 uses diffraction gratings to disperse the light and measure Raman shifts corresponding to molecular vibrations. The spectrometer 116 sends spectral data in digital format to the computer 118, where the one or more processors 124 use the AI/ML interpretation model 134, which analyzes the spectral signature to detect molecular features indicative of melanin, protein, or lipid content-biomarkers associated with intraocular tumors 104. The AI/ML interpretation model 134 interprets the data and transmits the diagnostic output (including classification results, molecular probabilities, and other indicators) to a user interface 132 for clinical review.

In some embodiments, the laser 106, beam splitter 108, charge-coupled device 110, and the spectrometer 116 may be combined into a Raman probe. The Raman probe may be handheld, or may be mounted with a slit lamp.

The computer 118 may have one or more processors 124 communicatively connected to one or more network interfaces 126 and one or more storage 122 devices. The storage 122 may include memory 120, such as random access memory, read-only memory, and similar. Storage 122 may also include optical storage, disk drives, solid state drives, and similar. The storage 122 may include non-transitory instructions for the processors 124, one or more CNN classifiers 128, one or more AI/ML interpretation models 134, one or more Raman spectrum databases 130, and/or one or more report generators 114. The computer 118 may be communicatively connected to one or more user interfaces 132, such as a computer monitor, a keyboard, a touchscreen, a mouse, a laptop, a tablet, a smartphone, a smart watch, another computer, or a similar device. The connection between the computer 118 and the user interface 132 may be through the network interface 126 to a network or the connection may be through wires or wireless. The network interface 126 may connect to the Internet and/or to a cloud.

Figure 2:
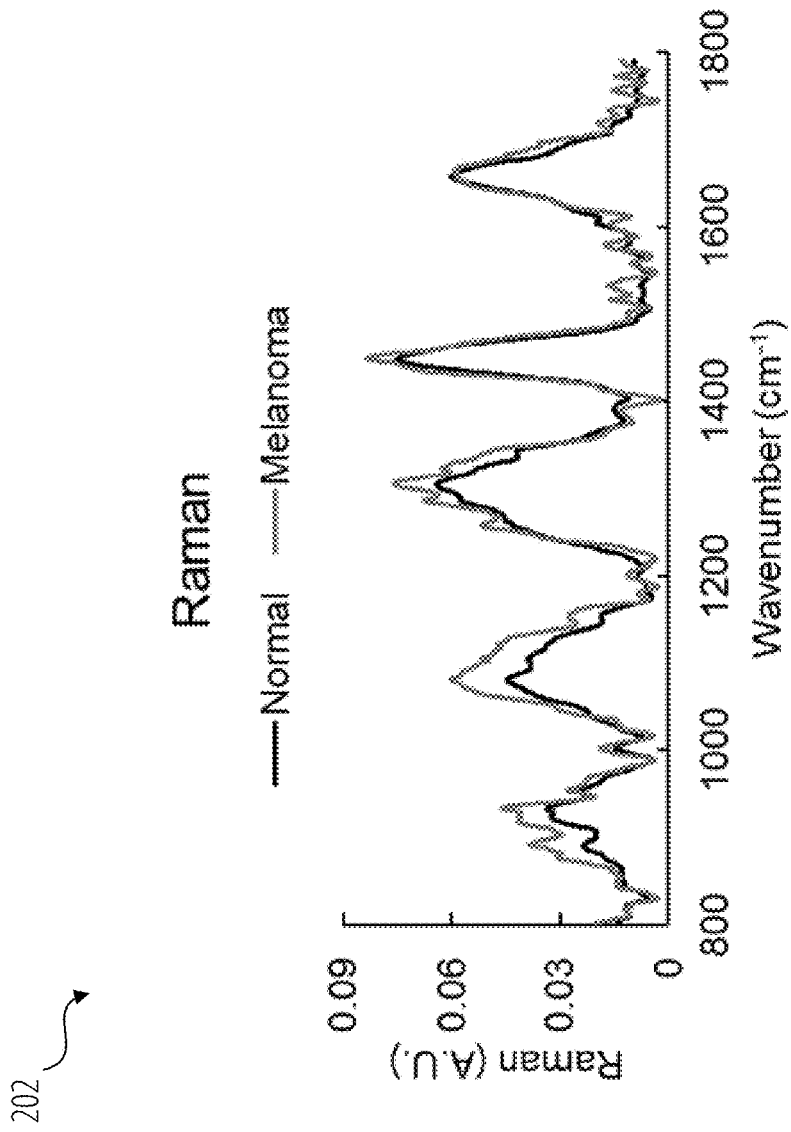
FIG. 2 illustrates a representative Raman spectrum of a skin melanoma compared with a normal skin biopsy.

FIG. 2 illustrates an example of a Raman spectrum 202 from a cutaneous melanoma showing a spectral difference when comparing malignant with normal tissue. The spectral curves clearly demonstrate differences in peak intensities and positions, which reflect molecular-level variations between cancerous and non-cancerous tissues. Although this figure illustrates data from cutaneous tissue, it serves as a representative example of how Raman spectroscopy captures diagnostic vibrational signatures that are applicable to intraocular tumor analysis. The underlying principles shown here are transferable to ophthalmic applications, particularly in differentiating uveal melanomas from benign nevi or other posterior segment lesions.

FIG. 3 shows a possible flow chart of the operation of the AI-enhanced Raman spectroscopy diagnostic system 112. In block 302, routine 300 directs monochromatic laser light into intraocular tissue. In block 304, routine 300 collects Raman-scattered light from the intraocular tissue and generating spectral data. In block 308, routine 300 analyzes the spectral data using an AI model to identify biomarkers associated with tumor 104 pathology. In block 312, routine 300 and outputs diagnostic information to a user interface 132. Routine 300, as illustrated in FIG. 3, encompasses the operational flow of the AI-enhanced Raman spectroscopy diagnostic system 112 during clinical use. In current configurations, this routine may be initiated and guided by a physician or trained technician, who manually selects the target tissue region and adjusts the optical alignment as needed. However, the routine is also designed to support future configurations involving autonomous or semi-autonomous scanning. In such embodiments, the AI-enhanced Raman spectroscopy diagnostic system 112 may incorporate automated focus adjustment, real-time ocular tracking, and beam steering technologies to independently identify and scan relevant ocular structures. The routine is thus modular, allowing both operator-controlled and AI-driven workflows within the same diagnostic framework.

FIG. 4 is a flowchart of an AI-based Raman subtype classification workflow. The flowchart begins by focusing a stable beam from the laser 106 at a tumor 104 and collecting the Raman spectra from the uveal mass with the charge-coupled device 110 and the spectrometer 116, in block 402. The spectrometer 116 or the computer 118 then perform spectral preprocessing, performing Nice filtering, normalization and baseline correction in block 404. The features are extracted, and the informative peaks, such as Amide I, III, phenylalanine, lipid banks, et al., are identified, in block 406. The AI/ML interpretation model 134 then creates an inference by matching the extracted features into subtype profiles (e.g. BAPii, EIF1AX mutant), in block 408. Then the AI/ML interpretation model 134 creates a composite diagnosis and the probabilities for multiple subtypes could be output with the report generator 114 to the user interface 132. Finally, the AI/ML interpretation model 134 are tuned and retrained with feedback and validation from histopathology results in block 412.

Segmentation Engine for Tumor Boundary Targeting

In certain embodiments, the AI/ML interpretation model 134 includes a segmentation engine configured to identify and delineate intraocular tumor 104 boundaries and adjacent anatomical zones using structural imaging data, such as Optical Coherence Tomography 136 (OCT), ultrasound biomicroscopy (UBM), or multispectral reflectance imaging. Segmentation refers to the process by which the AI-enhanced Raman spectroscopy diagnostic system 112 assigns anatomical or pathological labels to each voxel or pixel of imaging data, thereby enabling the AI-enhanced Raman spectroscopy diagnostic system 112 to distinguish tumor 104 tissue from adjacent healthy structures such as the retina, choroid, sclera, or vitreous.

TABLE 16

Methods to Overcome Signal Attenuation in Posterior Segment Raman Analysis

| Method | Function |
| --- | --- |
| Segmentation | Isolates tumor tissue from surrounding anatomy to ensure Raman analysis targets only relevant zones; improves diagnostic specificity and reduces noise from non-tumorous regions. |
| Use of near-infrared (NIR) wavelengths | Reduces light scattering and enhances tissue penetration, allowing more Raman signal to reach posterior structures through the vitreous. |
| Confocal Raman configurations | Rejects out-of-focus or scattered light, enhancing Raman signal acquisition from precise tumor depths. |
| SERS probes with forward-facing optics | Amplifies local Raman signals using plasmonic enhancement; increases detection sensitivity at targeted tumor sites. |
| Minimally invasive micro-optical fibers | Reduces the distance and media between probe and tumor, minimizing signal loss due to vitreous attenuation. |
| Adaptive optics | Corrects for optical distortions and improves signal focus in heterogeneous intraocular media like the vitreous. |
| Higher excitation power (within safe limits) | Increases Raman signal intensity to offset attenuation while maintaining ocular safety thresholds. |

Figure 5:
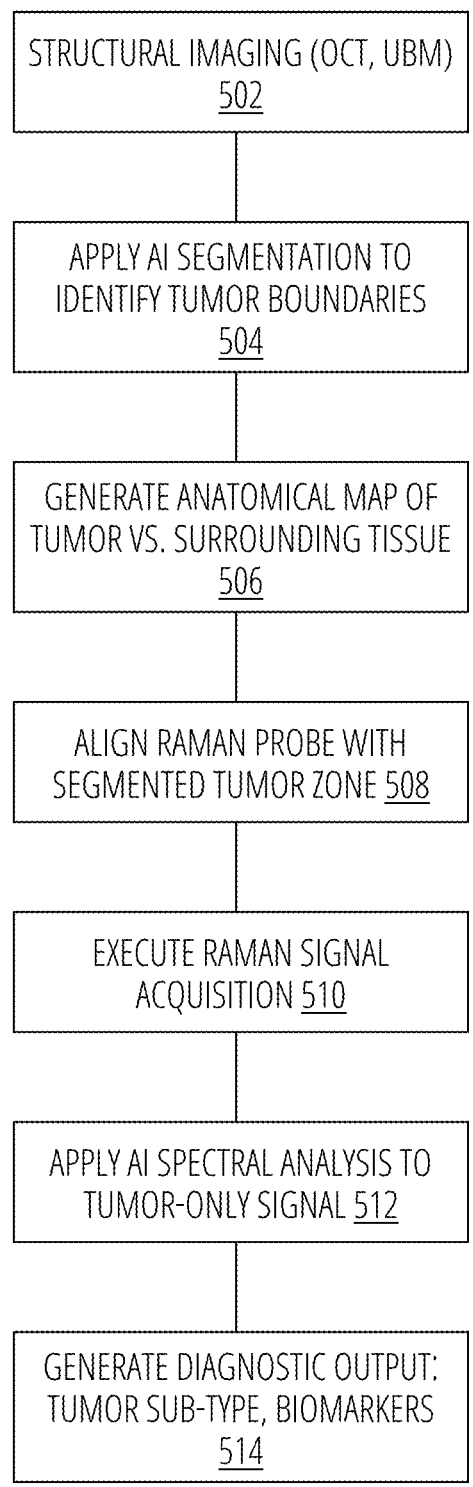
FIG. 5 illustrates an embodiment of an AI-Assisted Segmentation Workflow for Intraocular Tumor Raman Analysis.

As seen in FIG. 5, the segmentation output may be used to precisely guide Raman excitation and signal acquisition to within the tumor 104 mass and to exclude or suppress Raman signals from surrounding non-neoplastic tissues. The segmentation output may be used to adjust focal depth, lateral orientation, or confocal windowing of the Raman probe in real time and to generate anatomical maps for preoperative planning or longitudinal monitoring. The segmentation output may also be used to modify AI spectral interpretation algorithms based on the classified tissue type or tumor 104 subtype.

To implement this, the segmentation engine may employ supervised deep learning architectures, including Convolutional neural networks (CNNs) trained to identify tumor 104 margins in cross-sectional OCT slices; 3D U-Net architectures applied to volumetric image stacks for depth-aware segmentation of tumors embedded within the choroid or retina; and transformer-based encoders that integrate spatial context and accommodate variable tumor morphologies.

These AI/ML interpretation models 134 are trained using annotated multimodal datasets that include diverse tumor 104 types such as uveal melanoma, hemangioma, retinoblastoma, and pigmented nevus. The AI-enhanced Raman spectroscopy diagnostic system 112 is capable of segmenting lesions in anatomically challenging areas, such as near the optic disc, ciliary body, or macular region.

Integration with the Raman probe allows for real-time probe adjustment based on segmentation feedback. For example, in a posterior choroidal melanoma case, segmentation output may adjust the confocal offset to avoid overlying vitreous scatter, while in a peripheral tumor 104; the AI-enhanced Raman spectroscopy diagnostic system 112 may redirect the probe using scleral transillumination with enhanced lateral alignment.

By focusing analysis on the segmented tumor 104 region, the AI-enhanced Raman spectroscopy diagnostic system 112 improves diagnostic accuracy, signal relevance, and biomarker quantification. This is particularly important when targeting heterogeneous lesions or tumors 104 partially obscured by retinal vessels or media opacities.

The diagnostic advantages of segmentation are multifaceted. First, segmentation improves the specificity of Raman-based molecular analysis by ensuring that the spectra are derived exclusively from neoplastic tissue, thereby reducing false positives due to signal contamination. Second, by allowing the AI/ML interpretation model 134 to operate on structurally defined tumor 104 zones, segmentation facilitates subtype classification (e.g., distinguishing amelanotic melanoma from benign nevus) based on region-specific biomarker patterns. Third, segmentation enables quantitative tracking of tumor 104 boundaries and biochemical composition over time, supporting non-invasive longitudinal monitoring and therapy response assessment. Finally, segmentation-guided analysis may reduce or eliminate the need for invasive procedures, such as fine-needle aspiration biopsy, particularly in cases where lesion access is anatomically difficult or patient risk is high. These benefits collectively enhance diagnostic reliability, procedural safety, and clinical decision-making in the management of intraocular tumors 104.

TABLE 17

Segmentation Functions and Diagnostic Impact in Intraocular Tumor Raman Analysis

| Segmentation Function | Impact on Raman Analysis | Clinical Relevance |
|---|---|---|
| Delineates tumor boundaries | Ensures Raman excitation and detection are confined to tumor tissue, improving diagnostic relevance. | invasive diagnosis and surgical Improves localization for non-planning. |
| Excludes adjacent retinal or choroidal structures | Minimizes spectral interference from surrounding non-tumorous tissue. | Reduces false positives and improves confidence in tumor-specific biomarker interpretation. |
| Improves spatial targeting and reproducibility | Enhances alignment of repeated scans and reduces variability in signal capture. | Enables consistent monitoring of tumor changes over time. |
| Optimizes focal alignment for subsurface tumors | Adjusts confocal optics or probe orientation for improved Raman signal from deeper structures. | Improves diagnostic access to choroidal and posterior tumors. |
| Enables region-specific AI interpretation | Applies localized AI diagnostic models based on anatomical segmentation output. | Supports differentiation of tumor subtypes or mixed lesions. |
| Enhances signal-to-noise and specificity | Improves spectral quality and strengthens identification of tumor-associated biomarkers. | Increases diagnostic sensitivity and reduces need for biopsy. |
| Supports longitudinal region tracking | Enables consistent monitoring of biochemical profiles in anatomically registered tumor zones. | Facilitates response assessment during therapy or follow-up Icare. |

FIG. 5 shows one possible embodiment for the segmented analysis of tumors 104. First, the image of the tumor 104 is found using structural imaging such as Optical Coherence Tomography 136 (OCT) or ultrasound biomicroscopy (UBM) in block 502. Then, the AI/ML interpretation model 134 uses AI segmentation to identify tumor 104 boundaries in block 504. Next, an anatomical map of the tumor 104 and the surrounding tissue is generated in block 506, and the map is used to align the Raman probe with the segmented tumor 104 zone, in block 508. The laser 106, beam splitter 108, charge-coupled device 110, and spectrometer 116 then execute Raman signal acquisition in block 510. The AI/ML interpretation model 134 then applies the AI spectral analysis to the tumor-only signal in block 512, and the report generator 114 generates the diagnostic output articulating the tumor 104 subtype and the biomarkers in block 514.

Those skilled in the art will appreciate that the exemplary embodiments and descriptions thereof are merely illustrative of the inventions as a whole. Any dimensions used herein are for example, and any dimension may be modified without changing the scope of the claims. While the principles of the inventions have been made clear in the exemplary embodiments, it will be obvious to those skilled in the art that modifications of the structure, arrangement, proportions, elements, and materials may be utilized in the practice of the inventions, which are particularly adapted to specific environments and operative requirements without departing from the principles of the inventions.

The invention claimed is:

1. A system for diagnosing intraocular tumors using Raman spectroscopy, comprising:
a Raman excitation source configured to direct monochromatic laser light into an eye;
a beam splitter positioned to receive backscattered light from the eye and redirect Raman-scattered light;
a spectrometer optically coupled to the beam splitter and comprising a charge-coupled device (CCD) configured to collect Raman-scattered photons and generate raw spectral data;
an artificial intelligence processing unit operatively connected to the spectrometer and configured to analyze said spectral data to identify spectral features indicative of intraocular tumors with an artificial intelligence model trained using a dataset comprising Raman spectra of intraocular tissues; and
a user interface configured to receive and display diagnostic outputs generated by the artificial intelligence processing unit.

2. The system of claim 1, wherein the Raman excitation source emits laser light at a wavelength selected from a group consisting of 785 nm, 830 nm, and 1064 nm.

3. The system of claim 1, further comprising a multi-modal interface configured to integrate optical coherence tomography (OCT) imaging data with Raman spectral data to enhance diagnostic precision.

4. The system of claim 1, wherein the Raman excitation source and spectrometer are configured in a backscattering geometry, enabling the Raman-scattered light to travel along a same optical path as the monochromatic laser light.

5. The system of claim 1, wherein the beam splitter is configured to direct backscattered Raman photons into the spectrometer while allowing monochromatic laser light to pass into the eye.

6. The system of claim 1, wherein the spectrometer includes a diffraction grating configured to spatially separate Raman-shifted light according to vibrational modes of an intraocular tissue sample or a Raman-active constituent therein.

7. The system of claim 1, wherein the system is configured to operate in a time-gated detection mode to suppress fluorescence and enhance signal-to-noise ratio.

8. The system of claim 1, further comprising optical filters configured to attenuate Rayleigh-scattered light prior to delivery to the CCD.

9. The system of claim 1, further comprising surface-enhanced Raman spectroscopy (SERS) capability that is operable with or without confocal optical elements.

10. The system of claim 1, wherein the artificial intelligence processing unit provides real-time visualization of Raman-acquired data overlaid with anatomical localization.

11. The system of claim 1, wherein feedback from pathology-confirmed outcomes is used to retrain the artificial intelligence processing unit in a supervised learning loop.

12. A method for diagnosing intraocular tumors using artificial intelligence-assisted Raman spectroscopy, comprising:
directing monochromatic laser light into intraocular tissue,
collecting Raman-scattered light from the intraocular tissue and generating spectral data;
analyzing the spectral data using an artificial intelligence model, trained using a dataset comprising Raman spectra of intraocular tissues, to identify biomarkers associated with tumor pathology;
and outputting diagnostic information to a user interface, wherein the monochromatic laser light is generated by a Raman spectroscopy module comprising:
a Raman excitation source configured to direct the monochromatic laser light into an eye; and
a beam splitter positioned to receive backscattered light from the eye and redirect Raman-scattered light;
the Raman-scattered light is collected by the Raman spectroscopy module, where the Raman spectroscopy module further comprises:
a spectrometer optically coupled to the beam splitter; and
a charge-coupled device (CCD) configured to collect the Raman-scattered light and generate the spectral data.

13. The method of claim 12, wherein the artificial intelligence model is configured to update through adaptive or federated learning mechanisms based on ongoing data acquisition and biomarker discovery.

14. The method of claim 12, further comprising updating the artificial intelligence model to incorporate new spectral features corresponding to biomarkers subsequently identified through clinical or laboratory research.

15. The method of claim 12, wherein the artificial intelligence model is trained using a dataset comprising Raman spectra of intraocular tissues with and without silicone oil interference, and wherein the artificial intelligence model performs spectral separation and correction to mitigate signal degradation, further comprising use of transfer learning from pre-trained spectral classifiers and an application of unsupervised learning techniques to identify latent spectral features and enhance biomarker detection accuracy.

16. The method of claim 12, wherein said spectral analysis comprises matching against a dynamically expanding biomarker database, including future-identified molecular indicators of intraocular tumor pathology.

17. The method of claim 12, wherein the diagnostic information comprises classification of tumor type, stage, risk of metastasis, or treatment response prediction.

18. The method of claim 12, wherein the Raman-scattered light is filtered to exclude Rayleigh-scattered light before spectral analysis.

19. The method of claim 12, further comprising reducing corruption or attenuation of captured Raman spectral data by applying one or more enhancement techniques selected from a group consisting of near-infrared (NIR) excitation, spatially offset Raman spectroscopy (SORS), transmission Raman spectroscopy, resonance Raman spectroscopy (RRS), optical clearing agents (OCAs), enhanced signal collection optics, time-gated Raman spectroscopy, confocal Raman spectroscopy, Savitzky-Golay filtering, wavelet transform denoising, or adaptive smoothing algorithms.

20. The method of claim 12, wherein
the artificial intelligence model operates on an artificial intelligence engine on an artificial intelligence processing unit.

21. A non-invasive diagnostic apparatus comprising:
a monochromatic light source configured to emit laser light at a wavelength suitable for Raman excitation;
a beam path configured to direct laser light into intraocular tissue and to collect Raman-scattered light along a same axis;
a beam splitter configured to divert Raman-scattered light toward a detection subsystem;
a spectrometer including a diffraction element and a CCD detector configured to generate Raman spectra;
and an artificial intelligence module, trained using a dataset comprising Raman spectra of intraocular tissues, configured to analyze said spectra to detect molecular signatures associated with intraocular tumors.

22. A non-invasive diagnostic system for characterizing intraocular tumors, comprising:
- a Raman spectroscopy module configured to acquire molecular vibrational spectra from ocular tissue;
- an artificial intelligence engine trained on Raman spectral datasets from histopathologically confirmed intraocular tumors; and
- a diagnostic output interface configured to assign probability scores to tumor subtypes including but not limited to melanomas, metastatic lesions, lymphomas, and pediatric ocular tumors.

23. The non-invasive diagnostic system of claim 22, wherein the artificial intelligence engine is configured to distinguish between neoplastic and non-neoplastic intraocular abnormalities based on spectral features associated with melanin, nucleic acids, protein conformation, lipid composition, and oxidative stress markers.

24. The non-invasive diagnostic system of claim 22, wherein the artificial intelligence engine is further trained to identify non-neoplastic ocular lesions that mimic tumors, including granulomatous uveitis, sarcoidosis, infectious chorioretinitis, and idiopathic inflammatory pseudotumors.

25. The non-invasive diagnostic system of claim 24, wherein the diagnostic output interface is configured to include differential probabilities for neoplastic, inflammatory, and infectious etiologies based on Raman spectral profiles.

26. The non-invasive diagnostic system of claim 22, wherein the molecular vibrational spectra are used to classify metastatic intraocular lesions according to their systemic origin and molecular subtype, including breast cancer subtypes such as Luminal A, Luminal B, HER2-enriched, and triple-negative.

27. The non-invasive diagnostic system of claim 22, wherein the artificial intelligence engine is trained to distinguish between pediatric intraocular tumors, including retinoblastomas and medulloepitheliomas, based on their Raman spectral characteristics.

28. The non-invasive diagnostic system of claim 22, wherein the artificial intelligence engine provides a differential diagnosis between benign vascular lesions and neoplastic lesions based on extracellular matrix and vascular-related Raman features.

29. The non-invasive diagnostic system of claim 22, wherein inflammatory and infectious ocular conditions are differentiated from malignancies using a spectral database comprising granulomatous inflammation, viral chorioretinitis, toxoplasmosis, and autoimmune pseudotumors.

30. The non-invasive diagnostic system of claim 22, wherein the diagnostic output interface includes a visual user interface with region-specific diagnostic overlays and confidence scores for tumor versus mimicker classification.

* * * * *